United States Patent
Chung et al.

(10) Patent No.: US 12,170,561 B2
(45) Date of Patent: Dec. 17, 2024

(54) METHOD STATE IN WIRELESS COMMUNICATION SYSTEM, AND DEVICE THEREFOR

(71) Applicant: LG ELECTRONICS INC., Seoul (KR)

(72) Inventors: Jaehoon Chung, Seoul (KR); Haewook Park, Seoul (KR); Jiwon Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 501 days.

(21) Appl. No.: 17/607,832

(22) PCT Filed: Apr. 29, 2020

(86) PCT No.: PCT/KR2020/005728
§ 371 (c)(1),
(2) Date: Oct. 29, 2021

(87) PCT Pub. No.: WO2020/222548
PCT Pub. Date: Nov. 5, 2020

(65) Prior Publication Data
US 2022/0239357 A1  Jul. 28, 2022

Related U.S. Application Data

(60) Provisional application No. 62/841,231, filed on Apr. 30, 2019, provisional application No. 62/841,233, (Continued)

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01)

(58) Field of Classification Search
CPC ............................ H04B 7/0626; H04B 7/0456
See application file for complete search history.

(56) References Cited

U.S. PATENT DOCUMENTS

2018/0167116 A1* 6/2018 Rahman .............. H04B 7/0478

FOREIGN PATENT DOCUMENTS

| KR | 10-2017-0018046 A | 2/2017 |
| WO | 2018/228594 A1 | 12/2018 |

OTHER PUBLICATIONS

Spreadtrum Communications, "Discussion on Type II CSI overhead reduction" R1-1904780, 3GPP TSG RAN WG1 Meeting #96bis, Xi'an, China, Apr. 8-12, 2019, See section 2.1.
(Continued)

*Primary Examiner* — Rahel Guarino
(74) *Attorney, Agent, or Firm* — BRYAN CAVE LEIGHTON PAISNER LLP

(57) ABSTRACT

Disclosed in the present disclosure are a method for reporting channel state information (CSI) in a wireless communication system, and a device therefor. Specifically, a method for user equipment (UE) to report channel state information (CSI) in a wireless communication system comprises: a step for receiving CSI-related configuration information from a base station (BS); a step for receiving a reference signal from the base station; a step for calculating the CSI on the basis of the reference signal; and a step for transmitting the CSI to the base station. The step for calculating the CSI includes a step for quantizing a magnitude coefficient included in a matrix related to a codebook, a first set of reference amplitude and a second set of differential amplitude for the quantization of o the magnitude coefficient are predefined, and the magnitude coefficient may be quantized on the basis of a subset of (i) the first set and (ii) the second set.

15 Claims, 12 Drawing Sheets

Related U.S. Application Data filed on Apr. 30, 2019, provisional application No. 62/841,228, filed on Apr. 30, 2019, provisional application No. 62/841,226, filed on Apr. 30, 2019, provisional application No. 62/841,235, filed on Apr. 30, 2019.

(56) References Cited

OTHER PUBLICATIONS

ZTE, "CSI Enhancement for MU-MIMO Support", R1-1903343, 3GPP TSG RAN WG1 Meeting #96, Athens, Greece, Feb. 25-Mar. 1, 2019, See sections 1-2.

LG Electronics, "Evaluation on quantization methods for Type II overhead reduction", R1-1903357, 3GPP TSG RAN WG1 Meeting #96, Athens, Greece, Feb. 25-Mar. 1, 2019 See section 2.

\* cited by examiner

[FIG. 1]
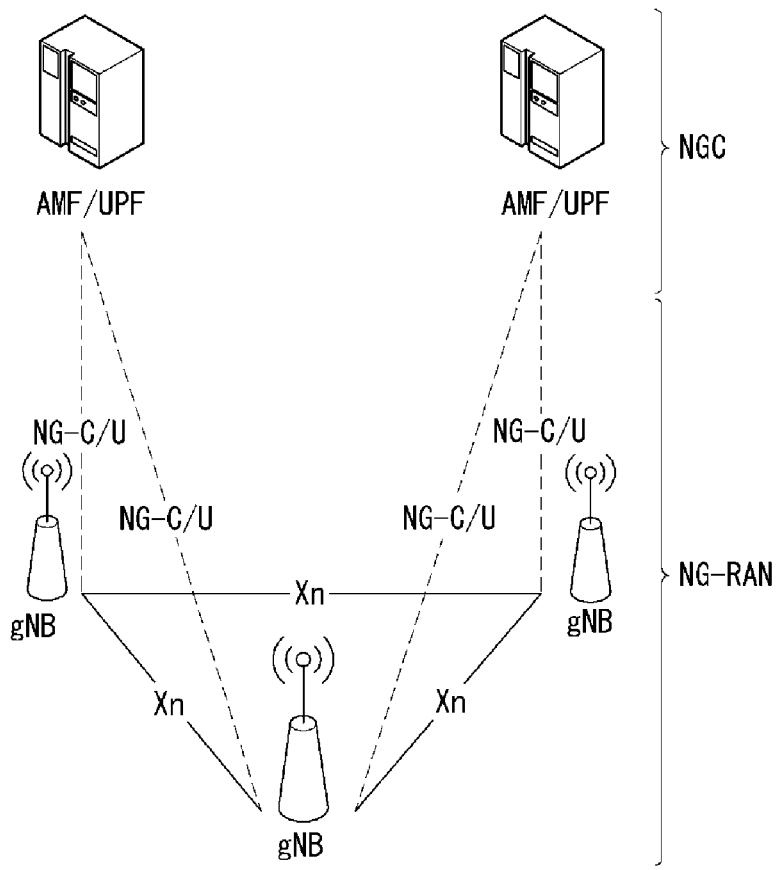
[FIG. 2]
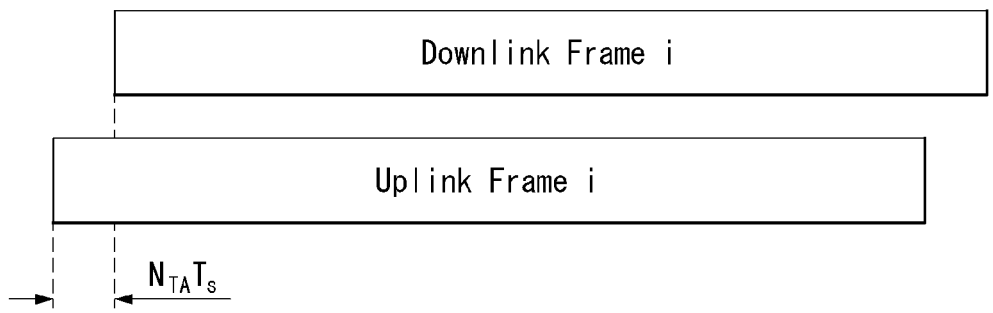

[FIG. 3]
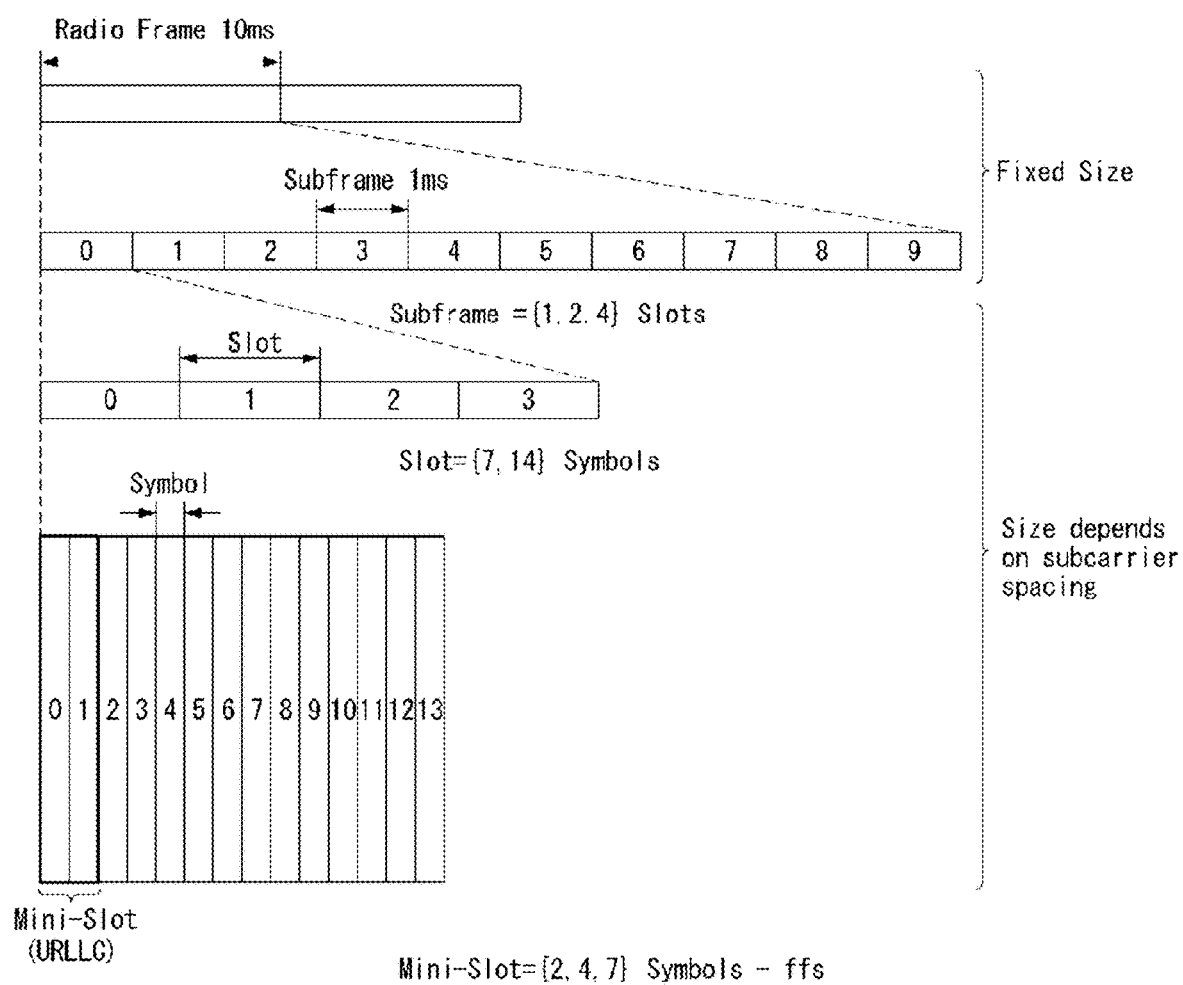

[FIG. 4]
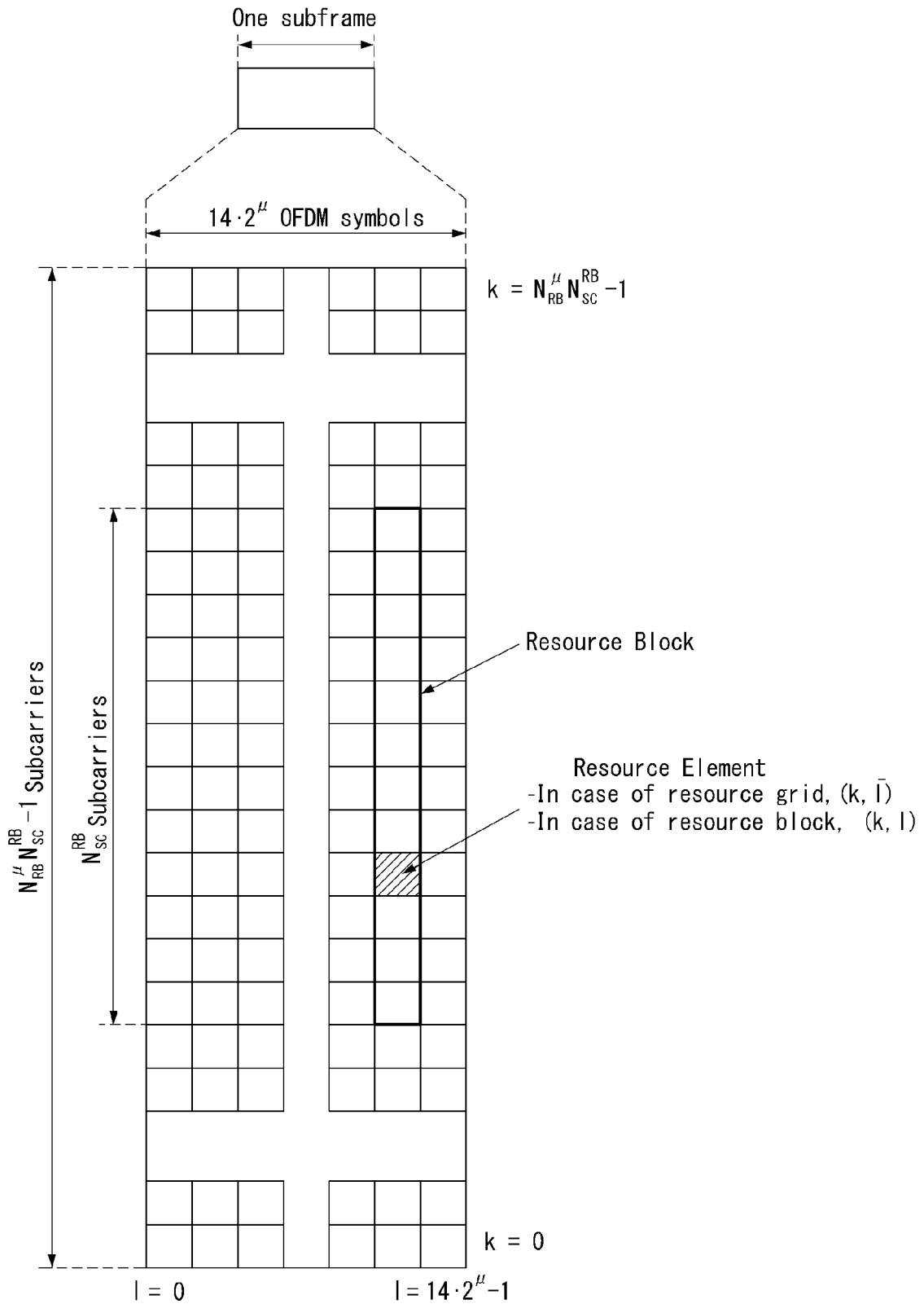

[FIG. 5]
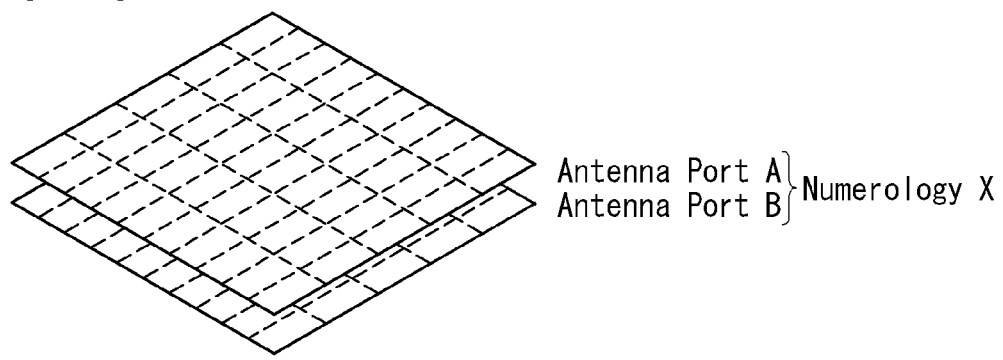
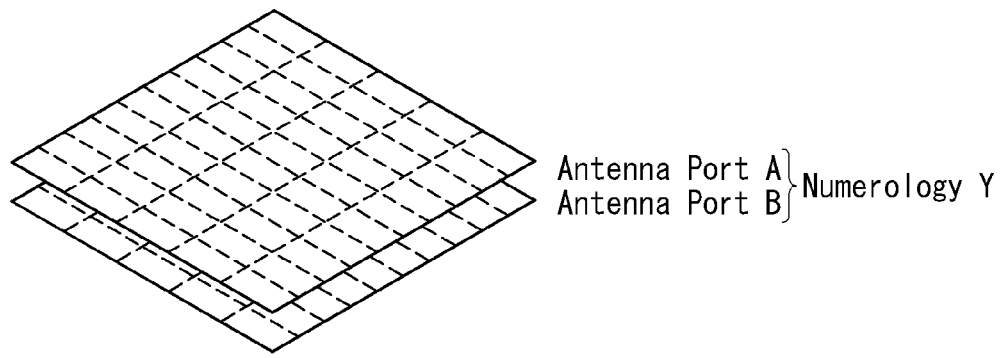

[FIG. 6]
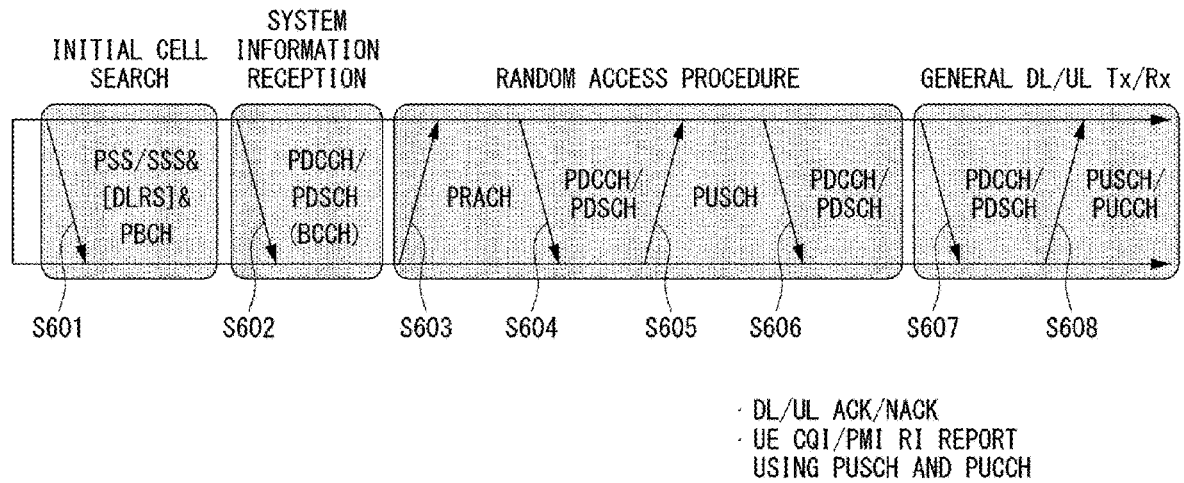

[FIG. 7]
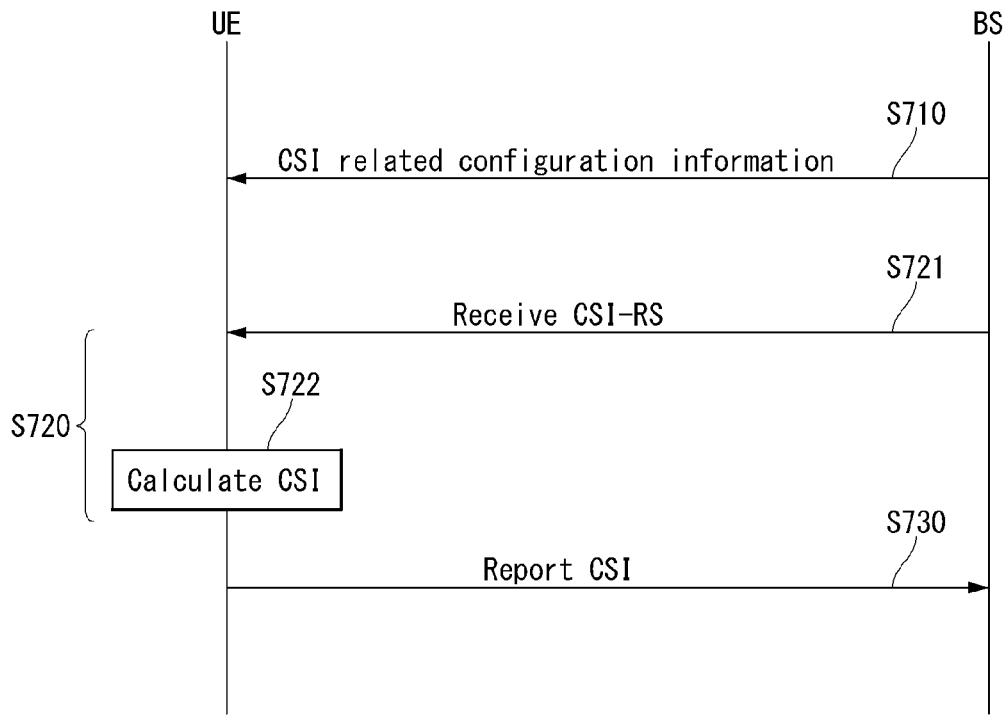
[FIG. 8]
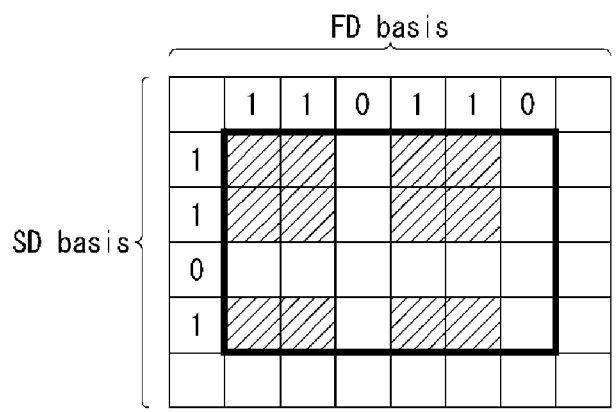

[FIG. 9]
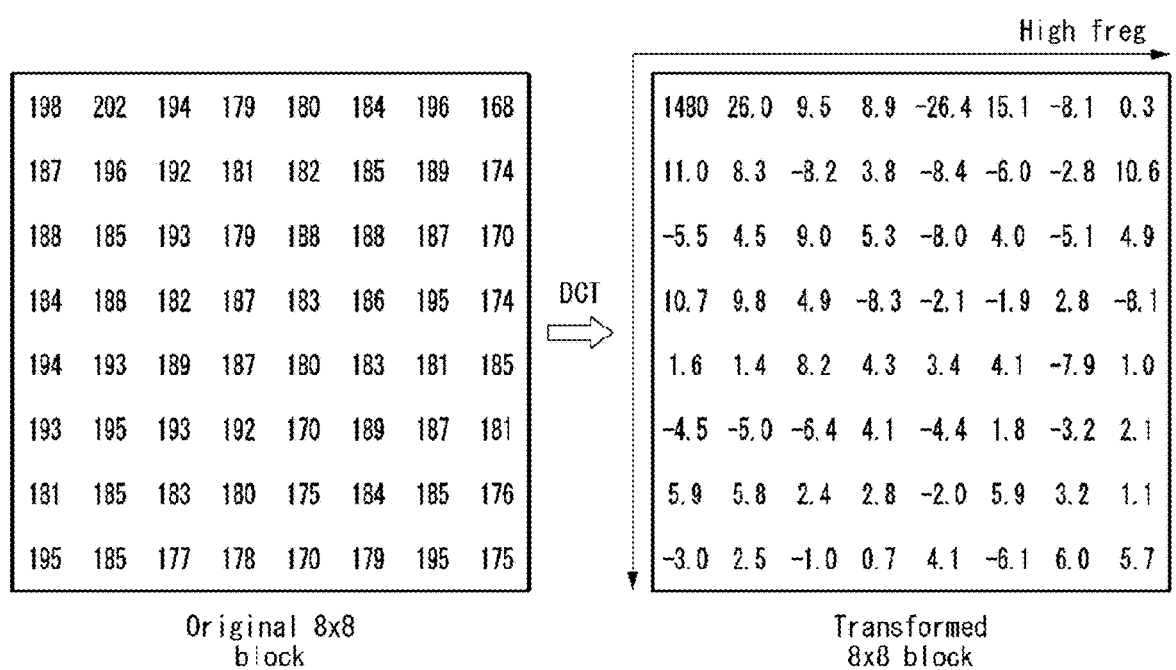

[FIG. 10]
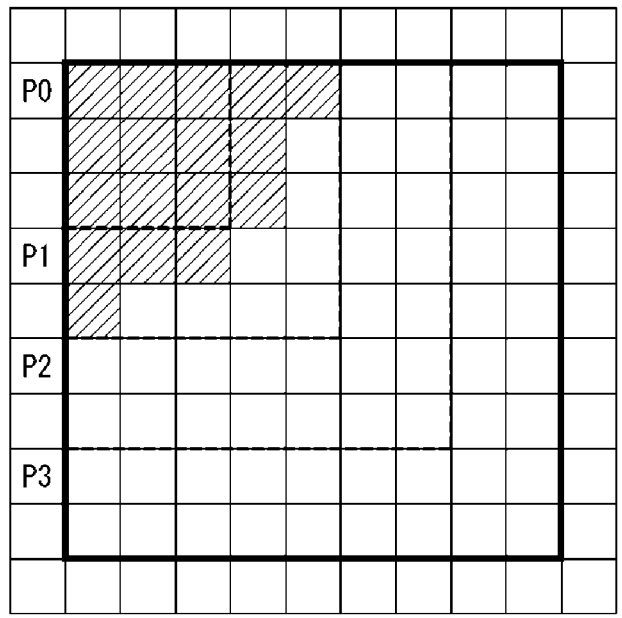
[FIG. 11]
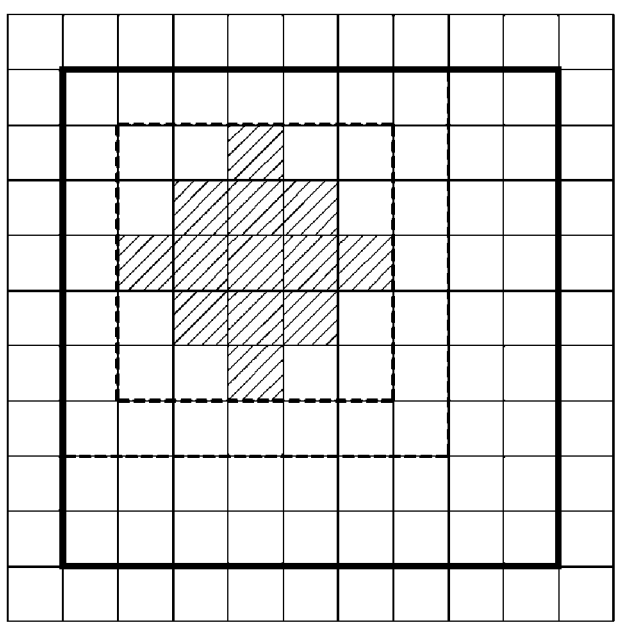

[FIG. 12]
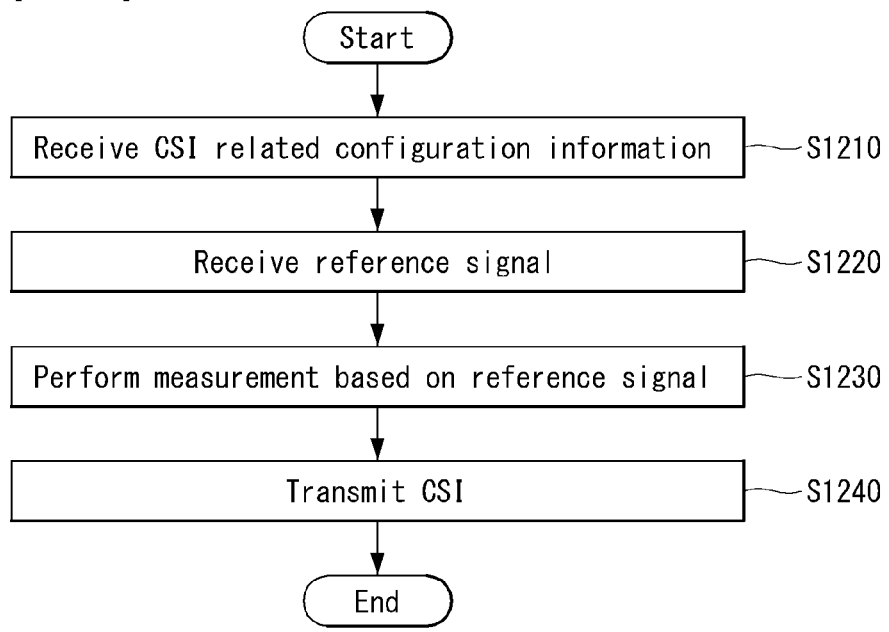
[FIG. 13]
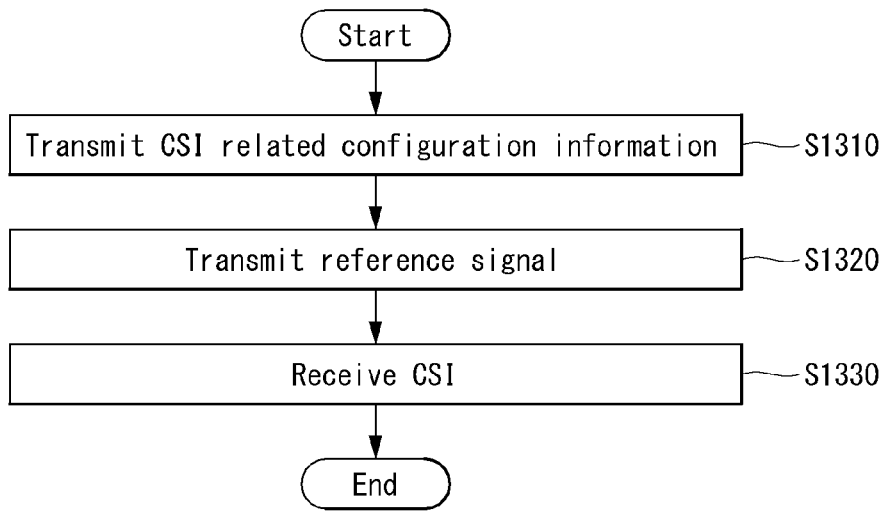

[FIG. 14]
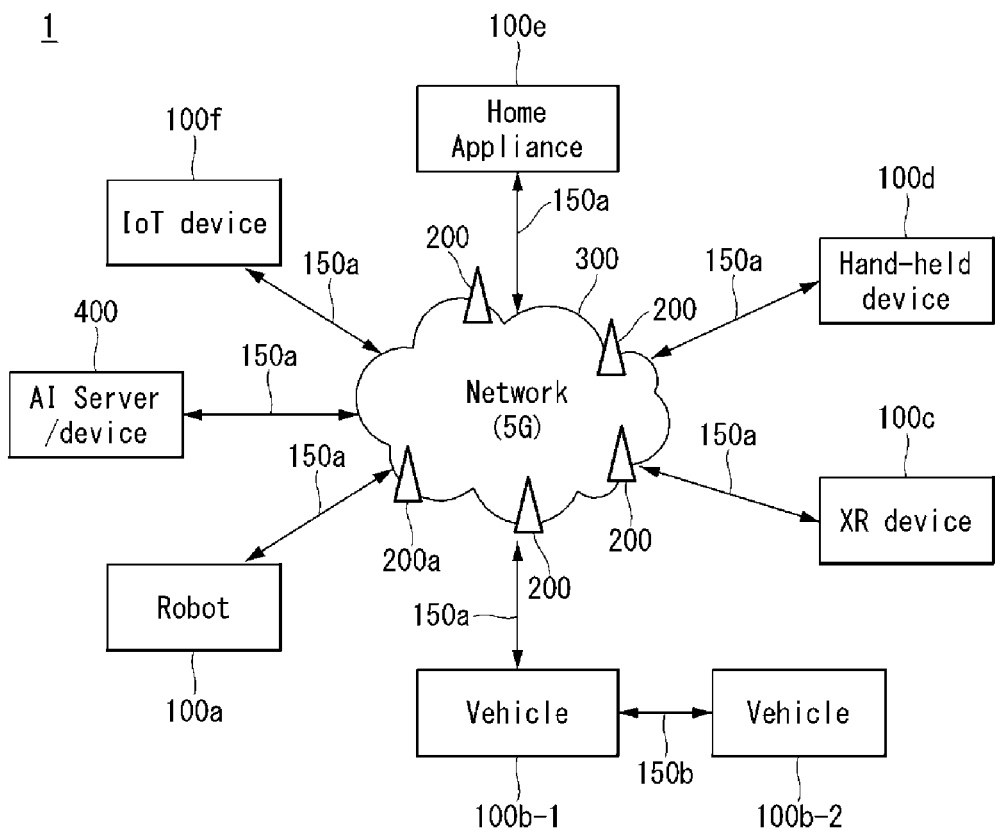
[FIG. 15]
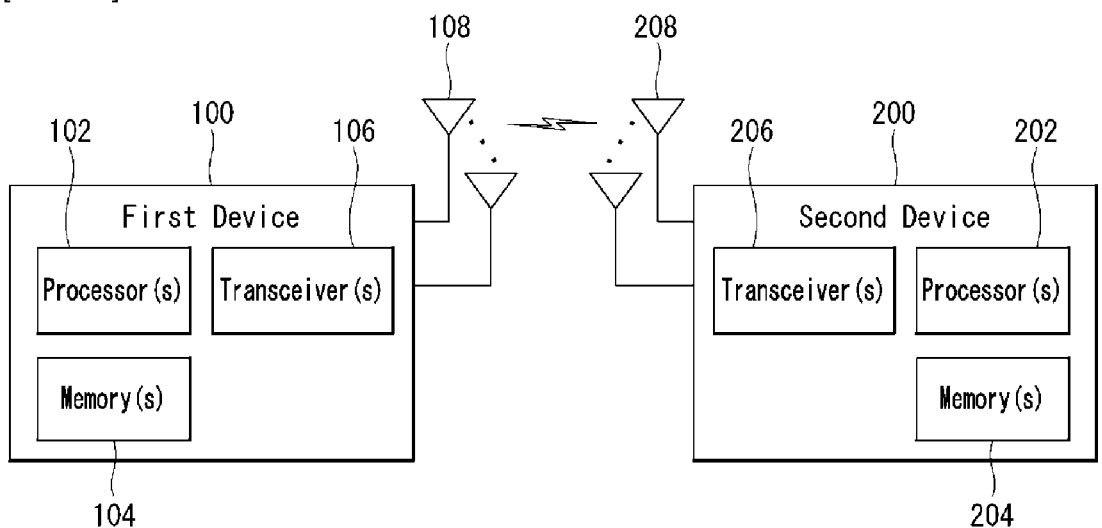

[FIG. 16]
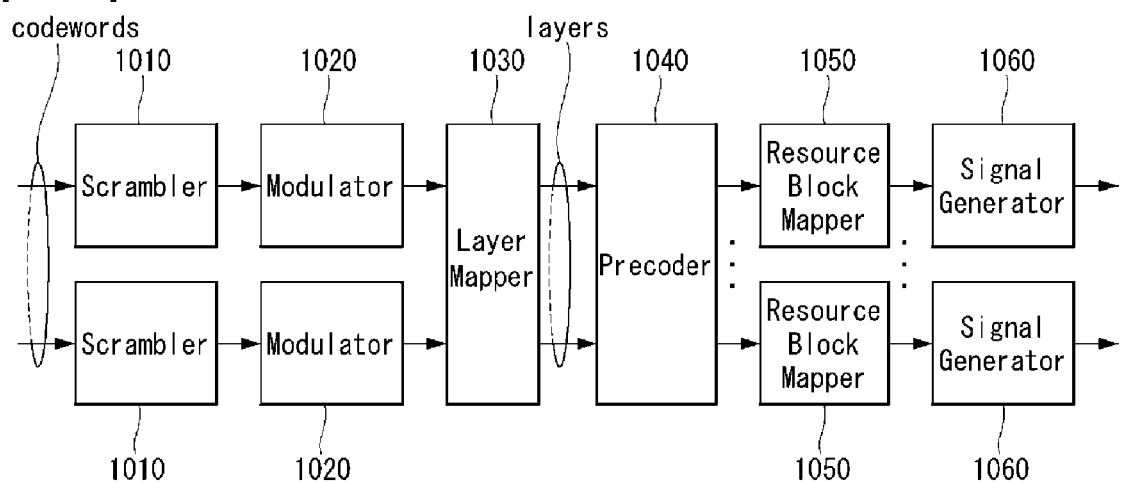
[FIG. 17]
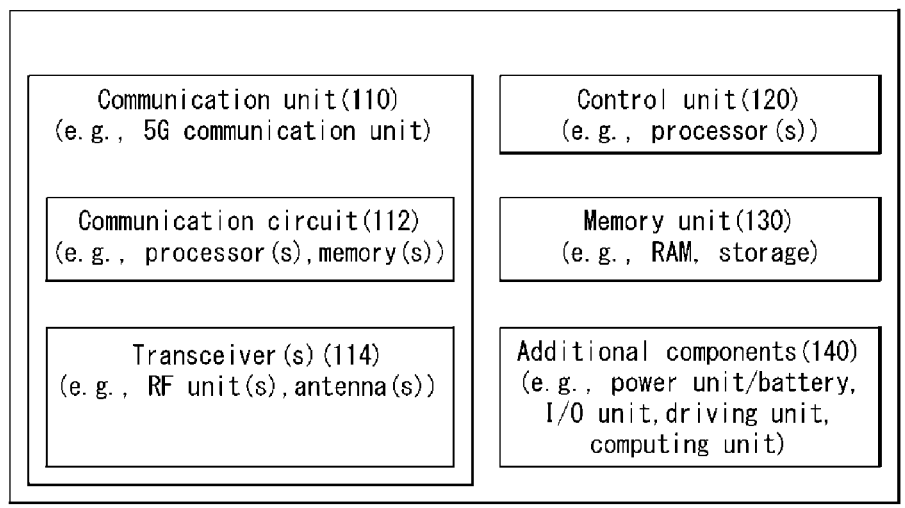

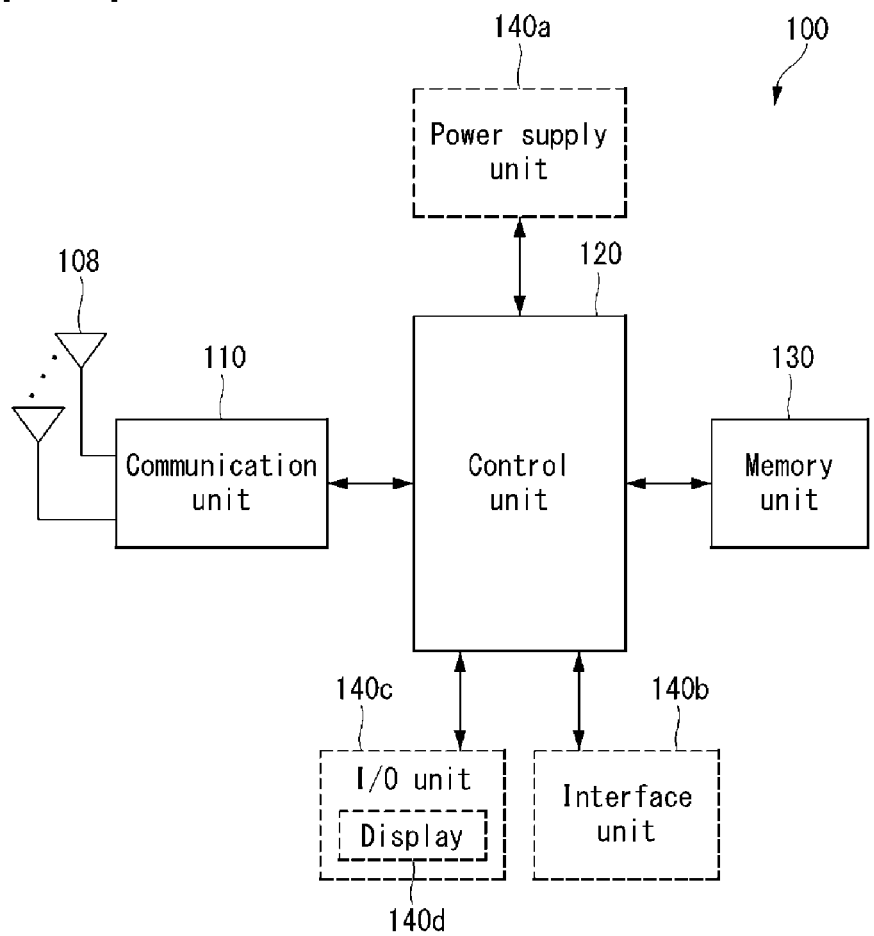

METHOD STATE IN WIRELESS COMMUNICATION SYSTEM, AND DEVICE THEREFOR

This application is the National Stage filing under 35 U.S.C. 371 of International Application No. PCT/KR2020/005728, filed on Apr. 29, 2020, which claims the benefit of and priority to U.S. Provisional Application No. 62/841,226, filed on Apr. 30, 2019, U.S. Provisional Application No. 62/841,231, filed on Apr. 30, 2019, U.S. Provisional Application No. 62/841,235, filed on Apr. 30, 2019, U.S. Provisional Application No. 62/841,233, filed on Apr. 30, 2019 and U.S. Provisional Application No. 62/841,228, filed on Apr. 30, 2019, the contents of which are all hereby incorporated by reference herein in their entirety.

TECHNICAL FIELD

The present disclosure relates to a wireless communication system, and more particularly, to a method for reporting channel state information based on a codebook design which is sophisticated, and efficient from an overhead perspective, and a device for supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure provides a method for reporting channel state information (CSI) in a wireless communication system.

Specifically, the present disclosure provides a method for designing an efficient codebook which is sophisticated, and efficient in terms of overhead, and reporting the channel state information based on the designed codebook.

Further, the present disclosure provides a method for transmitting bitmap information for a matrix including an amplitude coefficient and a phase coefficient in enhanced Type II CSI reporting.

Further, the present disclosure provides a method for performing quantization for the amplitude coefficient and the phase coefficient by considering characteristics for each rank indicator (RI)/layer, and transmitting quantization related information.

Further, the present disclosure provides a method for quantizing the amplitude coefficient and the phase coefficient differentially in a layer by considering characteristics of a channel transform method.

Technical problems to be solved by the present disclosure are not limited by the above-mentioned technical problems, and other technical problems which are not mentioned above can be clearly understood from the following description by those skilled in the art to which the present disclosure pertains

Technical Solution

In an aspect, provided is a method for reporting, by a user equipment (UE), channel state information (CSI) in a wireless communication system, which includes: receiving, from a base station (BS), CSI related configuration information; receiving, from the BS, a reference signal; calculating the CSI based on the reference signal; and transmitting, to the BS, the CSI, in which the calculating of the CSI may include quantizing an amplitude size coefficient included in a matrix related to a codebook, a first set of a reference amplitude for quantization of the amplitude coefficient and a second set of a differential amplitude may be predefined, and the amplitude coefficient may be quantized based on a subset of (i) the first set and (ii) the second set.

Further, in the method according to the embodiment of the present disclosure, the subset may be determined based on bitmap type information for the second set.

Further, in the method according to the embodiment of the present disclosure, the number of components of the subset may be determined based on a bit width for reporting the quantized amplitude coefficient.

Further, in the method according to the embodiment of the present disclosure, the subset may be determined based on an offset value, and from a first component of the second set up to a component corresponding to an index after the offset value may be selected as large as the number of components.

Further, in the method according to the embodiment of the present disclosure, the number of selected components is smaller than the number of components of the subset, the subset may be constituted by using a specific value.

Further, in the method according to the embodiment of the present disclosure, the subset may be selected in a comb form among components after the offset value of the second set.

Further, in the method according to the embodiment of the present disclosure, the number of selected components is smaller than the number of components of the subset, the subset may be constituted by a value corresponding to a largest index which is not selected in the second set.

Further, in the method according to the embodiment of the present disclosure, the quantization may be performed for each layer or layer group.

Further, in the method according to the embodiment of the present disclosure, the matrix related to the codebook may be generated by linearly combining a first matrix including a basis of a spatial domain and a second matrix including the basis of a frequency domain.

Further, in the method according to the embodiment of the present disclosure, an amplitude coefficient to be quantized may be determined based on a first bitmap for the basis of the spatial domain and a second bitmap for the basis of the frequency domain.

Further, in the method according to the embodiment of the present disclosure, a step-size between the respective components of the second set may be set to a multiple of a specific number.

Further, in the method according to the embodiment of the present disclosure, the calculating of the CSI may further include quantizing a phase coefficient included in the matrix related to the codebook.

Further, in the method according to the embodiment of the present disclosure, the reported CSI may include the subset related information.

In another aspect, provided is a user equipment (UE) for reporting Channel State Information (CSI) in a wireless communication system, which includes: one or more transceivers; one or more processors; and one or more memories storing instructions for operations executed by the one or more processors and connected to the one or more processors, in which the operations may include receiving, from a base station (BS), CSI related configuration information; receiving, from the BS, a reference signal; calculating the CSI based on the reference signal; and transmitting, to the BS, the CSI, the calculating of the CSI may include quantizing a size coefficient included in a matrix related to a codebook, a first set of a reference amplitude for quantization of the amplitude coefficient and a second set of a differential amplitude may be predefined, and the amplitude coefficient may be quantized based on a subset of (i) the first set and (ii) the second set.

In yet another aspect, provided is a method for receiving, by a base station (BS), channel state information (CSI) in a wireless communication system, which includes: transmitting, to a user equipment (UE), CSI related information; transmitting, to the UE, a reference signal; and receiving, from the UE, the CSI, in which the CSI may include information related to quantization of an amplitude coefficient included in a matrix related to a codebook, a first set of a reference amplitude for quantization of the amplitude coefficient and a second set of a differential amplitude may be predefined, and the amplitude coefficient may be quantized based on a subset of (i) the first set and (ii) the second set.

In still yet another aspect, provided is a base station (BS) for receiving channel state information (CSI) in a wireless communication system, which includes: one or more transceivers; one or more processors; and one or more memories storing instructions for operations executed by the one or more processors and connected to the one or more processors, in which the operations may include transmitting, to a user equipment (UE), CSI related information; transmitting, to the UE, a reference signal; and receiving, from the UE, the CSI, the CSI may include information related to quantization of an amplitude coefficient included in a matrix related to a codebook, a first set of a reference amplitude for quantization of the amplitude coefficient and a second set of a differential amplitude may be predefined, and the amplitude coefficient may be quantized based on a subset of (i) the first set and (ii) the second set.

In still yet another aspect, provided is a device including: one or more memories and one or more processors functionally connected to the one or more memories, in which the one or more processors may be configured to control the device to receive, from a base station (BS), CSI related configuration information, receive, from the BS, a reference signal, calculate the CSI based on the reference signal, and transmit, to the BS, the CSI, the calculating of the CSI may include quantizing an amplitude coefficient included in a matrix related to a codebook, a first set of a reference amplitude for quantization of the amplitude coefficient and a second set of a differential amplitude may be predefined, and the amplitude coefficient may be quantized based on a subset of (i) the first set and (ii) the second set.

In still yet another aspect, provided are one or more non-transitory computer-readable media storing one or more instructions in which the one or more instructions executable by one or more processors may include instructions for instructing a user equipment (UE) to receive, from a base station (BS), CSI related configuration information, receive, from the BS, a reference signal, calculate the CSI based on the reference signal, and transmit, to the BS, the CSI, the calculating of the CSI may include quantizing an amplitude coefficient included in a matrix related to a codebook, a first set of a reference amplitude for quantization of the amplitude coefficient and a second set of a differential amplitude may be predefined, and the amplitude coefficient may be quantized based on a subset of (i) the first set and (ii) the second set.

Advantageous Effects

According to an embodiment of the present disclosure, an efficient codebook which is sophisticated, and efficient in terms of overhead can be designed, and the channel state information can be reported based on the designed codebook.

Further, according to an embodiment of the present disclosure, bitmap information for a matrix including an amplitude coefficient and a phase coefficient can be transmitted in enhanced Type II CSI reporting.

Further, according to an embodiment of the present disclosure, quantization for the amplitude coefficient and the phase coefficient can be performed by considering characteristics for each rank indicator (RI)/layer, and quantization related information can be transmitted.

Further, according to an embodiment of the present disclosure, the amplitude coefficient and the phase coefficient can be quantized differentially in a layer by considering characteristics of a channel transform method.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a flowchart showing an example of a CSI associated procedure to which a method proposed in the present disclosure may be applied FIG. 8 illustrates an example of a bitmap based quantization method to which a method and/or an embodiment proposed in the present disclosure may be applied.

FIG. 9 illustrates an example of energy concentration characteristics on channel information transformed based on DCT.

FIG. 10 illustrates an example of a method for configuring a valid region for channel information transformed by a DCT scheme to which a method and/or an embodiment proposed in the present disclosure may be applied.

FIG. 11 illustrates an example of a method for configuring a valid region for the channel information transformed by a DFT scheme to which a method and/or an embodiment proposed in the present disclosure may be applied.

FIG. 12 illustrates an example of an operation flow of a UE performing CSI reporting to which a method and/or an embodiment proposed in the present disclosure may be applied.

FIG. 13 illustrates an example of operation sequences of a base station (BS) to which a method and/or an embodiment proposed in the present disclosure may be applied.

FIG. 14 illustrates a communication system applied to the present disclosure.

FIG. 15 illustrates a wireless device which may be applied to the present disclosure.

FIG. 16 illustrates a signal processing circuit for a transmit signal.

FIG. 17 illustrates another example of a wireless device applied to the present disclosure.

FIG. 18 illustrates a portable device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality.

Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ slot of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max, \mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k,l̄) is used to refer to a resource element in a slot, where l=0, . . . , $N_{symb}^\mu -1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Channel State Information Related Procedure

In a New Radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

FIG. 7 is a flowchart illustrating an example of a CSI related procedure.

Referring to FIG. 7, In order to perform one of usages of the CSI-RS, a terminal (e.g., user equipment (UE)) receives, from a base station (e.g., general Node B or gNB), configuration information related to the CSI through radio resource control (RRC) signaling (S710).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI resource configuration related information may be expressed as CSI-ResourceConfig IE. The CSI-RS resource set is identified by a CSI-RS resource set ID and one resource set includes at least one CSI-RS resource. Each CSI-RS resource is identified by a CSI-RS resource ID.

Table 5 shows an example of NZP CSI-RS resource set IE. As shown in Table 8, parameters (e.g., a BM related 'repetition' parameter and a tracking related 'trs-Info' parameter) representing the usage may be configured for each NZP CSI-RS resource set.

TABLE 5

| | |
|---|---|
| -- ASN1START | |
| -- TAG-NZP-CSI-RS-RESOURCESET-START | |
| NZP-CSI-RS-ResourceSet ::= | SEQUENCE { |
|     nzp-CSI-ResourceSetId | NZP-CSI-RS-ResourceSetId, |
|     nzp-CSI-RS-Resources | SEQUENCE (SIZE (1..maxNrofNZP-CSI-RS- |
| ResourcesPerSet)) OF NZP-CSI-RS-ResourceId, | |
|     repetition | ENUMERATED { on, off } |
|     aperiodicTriggeringOffset | INTEGER(0..4) |
|     trs-Info | ENUMERATED {true} |
|     ... | |
| } | |
| -- TAG-NZP-CST-RS-RESOURCESET-STOP | |
| -- ASN1STOP | |

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

the CSI report configuration related information may be expressed as CSI-ReportConfig IE and Table 9 below shows an example of CSI-ReportConfig IE.

In addition, the UE measures CSI based on configuration information related to the CSI (S720). The CSI measurement may include (1) a CSI-RS reception process (S722) and (2) a process of computing the CSI through the received CSI-RS (S724). A detailed description thereof will be made below.

In addition, for the CSI-RS, resource element (RE) mapping is configured time and frequency domains by higher layer parameter CSI-RS-ResourceMapping.

Table 7 shows an example of CSI-RS-ResourceMapping IE.

TABLE 6

```
-- ASN1START
-- TAG-CSI-RESOURCECONFIG-START
    CSI-ReportConfig ::=               SEQUENCE {
        reportConfigId                 CSI-ReportConfigId,
        carrier                        ServCellIndex           OPTIONAL, - - Need S
        resourcesForChannelMeasurement CSI-ResourceConfigId,
        csi-IM-ResourcesForInterference CSI-ResourceConfigId   OPTIONAL, - - Need R
        nzp-CSI-RS-ResourcesForInterference CSI-ResourceConfigId OPTIONAL, - - Need R
        reportConfigType               CHOICE {
            periodic                   SEQUENCE {
                reportSlotConfig                   CSI-ReportPeriodicityAndOffset,
                pucch-CSI-ResourceList             SEQUENCE (SIZE (1..maxNrotBWPs)) OF PUCCH-CSI-Resource
            },
            semiPersistentOnPUCCH      SEQUENCE {
                reportSlotConfig                   CSI-ReportPeriodicityAndOffset,
                pucch-CSI-ResourceList             SEQUENCE (SIZE (1..maxNrofBWPs)) OF PUCCH-CSI-Resource
            },
            semiPersistentOnPUSCH      SEQUENCE {
                reportSlotConfig                   ENUMERATED {sl5, sl10, sl20, sl40, sl80, sl160, sl320},
                reportSlotOffsetList               SEQUENCE (SIZE (1.. maxNrofUL-Allocations)) OF INTEGER(0..32),
                p0alpha                            P0-PUSCH-AlphaSetId
            },
            aperiodic                  SEQUENCE {
                reportSlotOffsetList               SEQUENCE (SIZE (1..maxNrofUL-Allocations)) OF INTEGER(0..32)
            }
        },
        reportQuantity                 CHOICE {
            none                       NULL,
            cri-RI-PMI-CQI             NULL,
            cri-RI-i1                  NULL,
            cri-RI-i1-CQI              SEQUENCE {
                pdsch-BundleSizeForCSI             ENUMERATED {n2, n4} OPTIONAL
            },
            cri-RI-CQI                 NULL,
            cri-RSRP                   NULL,
            ssb-Index-RSRP             NULL,
            cri-RI-LI-PMI-CQI          NULL
        },
```

TABLE 7

```
-- ASN1START
-- TAG-CSI-RS-RESOURCEMAPPING-START
CSI-RS-Resource,Mapping ::=          SEQUENCE {
    frequencyDomainAllocation        CHOICE {
        row1                             BIT STRING (SIZE (4)),
        row2                             BIT STRING (SIZE (12)),
        row4                             BIT STRING (SIZE (3)),
        other                            BIT STRING (SIZE (6))
    },
    nrofPorts                        ENUMERATED {p1,p2,p4,p8,p12,p16,p24,p32},
    firstOFDMSymbolInTimeDomain      INTEGER (0..13),
    firstOFDMSymbolInTimeDomain2     INTEGER (2..12)
    cdm-Type                         ENUMERATED {noCDM, fd-CDM2, cdm4-FD2-TD2, cdm8-
FD2-TD4),
    density                          CHOICE {
        dot5                             ENUMERATED {evenPRBs, oddPRBs},
        one                              NULL,
        three                            NULL,
        spare                            NULL
    },
    freqBand                         CSJ-FrequencyOccupation,
    ...
}
```

In Table 7, a density (D) represents a density of the CSI-RS resource measured in RE/port/physical resource block (PRB) and nrofPorts represents the number of antenna ports.

The UE reports the measured CSI to the eNB (S730).

Here, in the case where a quantity of CSI-ReportConfig of Table 7 is configured to 'none (or No report)', the UE may skip the report.

However, even in the case where the quantity is configured to 'none (or No report)', the UE may report the measured CSI to the eNB.

The case where the quantity is configured to 'none (or No report)' is a case of triggering aperiodic TRS or a case where repetition is configured.

Here, only in a case where the repetition is configured to 'ON', the UE may be defined to skip the report.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). Here, the CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (Cal), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured through RRC and refer to the CSI-ReportConfig IE.

ii)) SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. the SP CSI reporting has the same or similar activation/deactivation as a mechanism having data transmission on SPS PUSCH.

iii) the aperiodic CSI reporting is performed on the PUSCH and is triggered by the DCI. In this case, information related to trigger of aperiodic CSI reporting may be transferred/indicated/configured through MAC-CE.

In the case of AP CSI having AP CSI-RS, an AP CSI-RS timing is configured by the RRC. Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI.

The high latency CSI refers to CSI other than the low latency CSI. For a normal UE, (Z, Z') is defined in a unit of OFDM symbols. Z represents a minimum CSI processing time from the reception of the aperiodic CSI triggering DCI to the execution of the CSI reporting. Z' represents a minimum CSI processing time from the reception of the CSI-RS for channel/interference to the execution of the CSI reporting. Additionally, the UE reports the number of CSIs which may be simultaneously calculated.

CSI Reporting Using PUSCH

An aperiodic CSI reporting performed in the PUSCH supports wide band and lower band frequency granulation. The aperiodic CSI reporting performed on the PUSCH supports Type I and Type II CSIs.

An SP CSI reporting for the PUSCH supports type I and type II CSIs having wide band and subband frequency granularity. A PUSCH resource and a modulation and coding scheme (MCS) for the SP CSI reporting are semi-permanently allocated by UL DCI.

The CSI reporting for the PUSCH may include Part 1 and Part 2. Part 1 is used for identifying an information bit number of Part 2. Part 1 is completely delivered before Part 2.

In relation to a Type I CSI feedback, Part 1 contains an RI (if reported), a CRI (if reported), and a CQI of a first codeword. Part 2 includes a PMI and when RI>4, Part 2 may include a CQI.

For a Type II CSI feedback, Part 1 has a fixed payload size, and includes an RI, a CQI, and an indication (NIND) representing the number of non-zero wide band amplitude coefficients for each layer of Type II CSI. Fields of Part 1—RI, CQI, and an indication representing the number of non-zero wide band amplitude coefficients for each layer—are encoded separately. Part 2 includes the PMI of Type II CSI. Parts 1 and 2 are encoded separately.

The CSI report includes two parts in the PUSCH, and when the CSI payload has a smaller payload size provided by the PUSCH resource allocated for the CSI report, the UE may omit a part of second CSI. Omission of Part 2 CSI is determined according to the priority, and Priority 0 is a highest priority and $2N_{Rep}$ has a lowest priority.

CSI Reporting Using PUCCH

In the UE, multiple periodic CSI reporting may be configured, which corresponds to a CSI reporting configuration indication constituted by one or more higher layers. Here, a CSI measurement link and a CSI resource configuration which are related are constituted by higher layers.

Periodic CSI reporting in PUCCH format 2, 3 or 4 supports Type I CSI which is based on a wide bandwidth.

In respect to the SP CSI on the PUSCH, the UE performs SP CSI reporting for the PUCCH in slot $n+3N_{slot}^{subframe,\mu}+1$ after an HARQ-ACK corresponding to a PDSCH carrying a selection command is transmitted in slot n.

The selection command includes one or more report setting indications in which the related CSI resource configuration is configured.

The SP CSI report supports Type I CSI in the PUCCH.

The SP CSI report for PUCCH format 2 supports Type I CSI having wide band frequency granularity. The SP CSI report for In PUCCH format 3 or 4 supports Type I sub-band CSI and Type II CSI with the wide band frequency granularity.

When the PUCCH carries Type I CSI with the wide band frequency granularity, the CSI payload carried by PUCCH format 2 and PUCCH format 3 or 4 is the same as the CRI regardless of the RI (if reported).

In PUCCH format 3 or 4, a type I CSI lower band payload is divided into two parts.

A first part (Part 1) includes an RI, a (reported) CRI, and a (reported) CQI of a first codeword. A second part (Part 2) includes a PMI, and when RI>4, the second part (Part 2) includes a CQI of a second codeword.

The SP CSI reporting performed in PUCCH format 3 or 4 supports the type II CSI feedback, but supports only Part 1 of the type II CSI feedback.

In PUCCH format 3 or 4 supporting the type II CSI feedback, the CSI reporting may also depend on a UE capability.

Type II CSI report (corresponding to only Part 1 in the type II CSI reporting) delivered in PUCCH format 3 or 4 is calculated independently of the Type II CSI report performed in the PUSCH.

When the UE is configured as the CSI reporting in PUCCH format 2, 3, or 4, each PUCCH resource is configured for each candidate UL BWP.

When the UE receives an active SP CSI report configuration and does not receive an inactive command in the PUCCH, if a CSI reported BWP is an active BWP, the CSI report is performed and if not, the CSI report is temporarily stopped. This task is applied even to the SP CSI of the PUCCH. In respect to the PUSCH based SP CSI report, when BWP switching occurs, the corresponding CSI report is automatically deactivated.

According to a length of PUCCH transmission, the PUCCH format may be classified into a short PUCCH or a long PUCCH. PUCCH formats 0 and 2 may be referred to as the short PUCCH and PUCCH formats 1, 3, and 4 may be referred to as the long PUCCH.

In respect to the PUCCH based CSI report, a short PUCCH based CSI report and a long PUCCH based CSI report will be described below in detail.

The short PUCCH based CSI report is used only for the wide band CSI report. The short PUCCH based CSI report has the same payload regardless of an RI/CRI of a given slot in order to avoid blind decoding.

A size of an information payload may be different between maximum CSI-RS ports of the CSI-RS configured in the CSI-RS resource set.

When a payload including the PMI and the CQI is diversified to include the RI/CQI, a padding bit is added to the RI/CRI/PMI/CQI before an encoding procedure for equalizing a payload associated with another RI/CRI value. Further, the RI/CRI/PMI/CQI may be encoded with the padding bit as necessary.

In the case of the wide band report, the long PUCCH based CSI report may use the same solution as the short PUCCH based CSI report.

The long PUCCH based CSI report uses the same payload regardless of the RI/CRI. In the case of a lower band report, encoding of two parts (in the case of type I) is applied.

Part 1 may have a fixed payload according to the number of ports, a CSI type, an RI limit, etc, and Part 2 may have various payload sizes according to Part 1.

The CSI/RI may be first encoded in order to determine the payload of the PMI/CQI. Further, CQIi (i=1, 2) corresponds to a CQI for an i-th codeword (CW).

In respect to the long PUCCH, only Part 1 in the Type II CSI report may be delivered.

mation in the subband (SB) (e.g. combining the beam based on an amplitude and/or phase), a 'DFT-based compression' scheme described in Table 8 is considered.

Table 8 shows an example of describing the DFT based compression scheme as Type II CSI overhead reduction (compression) scheme of rank 1-2.

TABLE 8

| DFT-based compression |
|---|
| Precoders for a layer is given by size-P × $N_3$ matrix $W = W_1 \tilde{W}_2 W_f^H$ |
| $P = 2N_1N_2 = $ #SD dimensions |
| $N_3 = $ #FD dimensions |
| FFS value and unit of $N_3$ |
| Spatial domain (SD) compression |
| L spatial domain basis vectors (mapped to the two polarizations, so 2L in total) selected |
| Compression in spatial domain using $W_1 = \begin{bmatrix} v_0 v_1 \cdots v_{L-1} & 0 \\ 0 & v_0 v_1 \cdots v_{L-1} \end{bmatrix}$, |
| where $\{v_i\}_{i=0}^{L-1}$ are $N_1 N_2 \times 1$ orthogonal DFT vectors (same as Rel. 15 Type II) |
| Frequency-domain (FD) compression |
| Compression via $W_f = [W_f(0), \ldots, W_f(2L-1)]$ where $W_f(i) = [f_{k_{i,0}} f_{k_{i,1}} \cdots f_{k_{i,M_i-1}}]$, where $\{f_{k_{i,m}}\}_{m=0}^{M_i-1}$ are $M_i$ size-$N_3 \times 1$ orthogonal DFT vectors for SD-component $i = 0, \ldots, 2L-1$ |
| Number of FD-components $\{M_i\}$ or $\Sigma_{i=0}^{2L-1} M_i$ is configurable, FFS value range |
| FFS: choose one of the following alternatives |
| Alt1. common basis vectors: $W_f = [f_{k_0} f_{k_1} \cdots f_{k_{M-1}}]$, i.e. $M_i = M \; \forall i$ and $\{k_{i,m}\}_{m=0}^{M_i-1}$ are identical (i.e, $k_{i,m} = k_m$, i= 0, \ldots, 2L-1) |
| Alt2. independent basis vectors: $W_f = [W_f(0), \ldots, W_f(2L-1)]$, where $W_f(i) = [f_{k_{i,0}} f_{k_{i,1}} \cdots f_{k_{i,M_i-1}}]$, i.e. $M_i$ frequency-domain components are selected |
| FFS: If oversampled DFT basis or DCT basis is used instead of orthogonal DFT basis |
| FFS: Same or different FD-basis selection across layers |
| Linear combination coefficients (for a layer) |
| FFS if $\tilde{W}_2$ is composed of $K = 2LM$ or $K = \Sigma_{i=0}^{2L-1} M_i$ linear combination coefficients |
| FFS if only a subset $K_0 < K$ of coefficients are reported (coefficients not reported are zero). |
| FFS quantization/encoding/reporting structure |

The contents (e.g., a 3GPP system, a CSI-related operation, etc.) described above may be applied in combination with methods proposed in the present disclosure or may be supplemented to clarify technical features of the methods proposed in the present disclosure.

In the present disclosure, '/' may mean that all of the contents distinguished by/are included (and) or only some of the distinguished contents are included (or). Further, in the present disclosure, the following terms are unified and used. However, using such a term does not limit the technical scope of the present disclosure.

CSI: Channel state information
UCI: Uplink control information
DFT: Discrete Fourier Transform
DCT: Discrete cosine transform
LC: Linear combination
WB: Wideband
SB: Subband
SD: Spatial domain
FD: Frequency domain
CQI: Channel quality information
RI: Rank indicator A high-resolution feedback method such as a linear combination (LC), a covariance matrix feedback, etc., is considered for channel state information (CSI) feedback which is accurate, and efficient in terms of feedback overhead. In particular, in a New RAT (NR) system, in the case of the Type II CSI feedback, as a scheme of combining the beam with $W_1$ constituted by L orthogonal Discrete Fourier Transform (DFT) beams corresponding to wideband (WB) infor- The above-described scheme indicates that information on a spatial domain (SD) and a frequency domain (FD) of the CSI expresses channel information by utilizing a basis or codebook such as DFT. A size of an entire CSI feedback reported to the BS is influenced by the number of combined beams, the amount of quantization for combining coefficient, a sub-band size, etc., and in the CSI feedback, most payload is generated when the UE reports, to the BS, combining coefficient information such as $\tilde{W}_2$. Here, $\tilde{W}_2$ is constituted by linear combination coefficients for the SD and FD codebooks in the DFT-based compression scheme.

In the case of Type II CSI supported in Rel-15 or enhanced Type II CSI of Rel-16, multiple DFT (or DCT) beams are linearly combined by using the amplitude and/or phase coefficients to constitute the codebook for the CSI configuration for one layer. When the UE reports CSI constituting multiple layers (e.g., RI>1) by using the codebook, each of the parameters (e.g., amplitude, phase, DFT (or DCT) beam set, etc.) is independently calculated at the time when the UE calculates the CSI.

In particular, for a case of rank >1, since an SD/FD compression codebook should be separately designated for each layer or the channel information is constituted by convolution summation of $\tilde{W}_2$ for the SD and FD codebooks for each layer even though the same codebook is applied to all layers, channel information which should be fed back also linearly increases as the rank becomes larger. Accordingly, when the amount of quantization for the channel information for each layer is not separately considered, but is continuously equally configured, a large loss occurs in terms of a feedback payload.

Channel capabilities of respective layers for the channel between the UE and the BS having multiple antenna ports is influenced by an eigen-value(s) of the corresponding channel, and have different values. Here, the antenna port may be replaced with an antenna element. Hereinafter, for convenience of description, the antenna port and the antenna element will be collectively referred to as the antenna port. However, using such a term does not limit the technical scope of the present disclosure. Further, the number of layers has a correlation with the number of eigen-value(s). The channel information may be expressed as convolution summation of eigen-vector(s) corresponding to the eigen-value(s), and a size relationship of the eigen-value(s) may become a criterion capable of judging importance in expressing the channel information. In this case, channel information of a high layer (e.g., layer 3) corresponding a smallest eigen-value is expressed by applying a relatively lower quantization level than channel information of a low layer (e.g., layer 0), the loss for the total channel accuracy may not be large.

Accordingly, in the present disclosure, proposed are a method for differentially setting a quantization level for each layer by considering the rank/layer when quantization for complex value information of $\tilde{W}_2$ (e.g., a matrix of the linear combination coefficients or the PMI of Type II CSI or Type II CSI codebook) which the UE should report to the BS in the Type II CSI report, and a CSI reporting method based thereon. Specifically, proposed are a quantization method and a method for reporting quantization scheme information.

In the present disclosure, it is assumed that the Type II CSI codebook (including the enhanced Type II CSI codebook) includes an SD basis related matrix, an FD basis related matrix, and a matrix of LC coefficients. Further, the matrix of the LC coefficients may include amplitude coefficients and phase coefficients. The codebook may be replaced with a term such as a precoder or a precoding matrix, and the basis may be replaced with a basis vector, a component, etc. For example, the codebook may be represented as $W=W_1\tilde{W}_2W_f^H$, and here, $W_1$ represents the SD the codebook may be represented as $W=W_1\tilde{W}_2W_f^H$, and here, $W_1$ represents the SD basis related matrix, $\tilde{W}_2$ represents the matrix of the LC coefficients, and $W_f^H$ represents the FD basis related matrix. $\tilde{W}_2$ may be represented by a matrix of a size of 2L×M. Here, 2L represents the number of SD bases (here, L is the number of beam/antenna ports in the SD, and the total number of SD bases may become 2L by considering polarization), and M represents the number of FD bases. Hereinafter, for convenience of description, the Type II CSI codebook will be described as a reference.

As an example, the Type II codebook in a situation in which the rank is 1 is shown in Equation 3.

The UE may approximate and express radio channel information may to the information ($\tilde{W}_2$, the matrix of the LC coefficients) on the convolution summation of the SD basis related matrix $W_1$ and the FD basis related matrix $W_f^H$ which are predefined or configured, and the UE may perform the CSI report by transmitting the configuration information for the codebook and $\tilde{W}_2$ to the BS. In this case, a step of quantizing 2LM (e.g., D component number (2L)×FD component (M)) complex-valued coefficients constituting $\tilde{W}_2$ should be preceded, and a scheme therefor may be considered as in Table 9 below.

TABLE 9

For each layer, the following alternatives for quantizing each of the coefficients in $\tilde{W}_2$ are to be studied for down selection in RAN1-AH1901
Alt1A. Rel.15 3-bit amplitude; Rel.15 QPSK and 8PSK co-phasing
Alt1B. Rel.15 3-bit amplitude; Rel.15 QPSK, Rel.15 8PSK, and new 16PSK co-phasing
Alt2A. Rel.15 3-bit wideband amplitude for each beam, ⅔-bit differential amplitude for FD coefficients; Rel.15 QPSK and 8PSK co-phasing
Alt2B. Rel.15 3-bit wideband amplitude for each beam, ⅔-bit differential amplitude for FD coefficients; Rel.15 QPSK, Rel.15 8PSK, and new 16PSK co-phasing
Alt2C. Rel.15 3-bit wideband amplitude + Rel.15 QPSK and 8PSK wideband co-phasing for each beam, ⅔-bit differential amplitude and co-phasing for FD coefficients;
Alt3. A-bit amplitude for each of 2L beams, B-bit amplitude for each of M FD components, 1-bit differential amplitude and 8PSK co-phasing for each of the 2LM FD coefficients
Alt4. For each beam,
B0-bit amplitude and C0-bit phase for coefficients for the P0 strongest coefficients,
B1-bit amplitude and C1-bit phase for coefficients for the P1 2nd strongest coefficients
...
BQ-1-bit amplitude and CQ-1-bit phase for coefficients for the PQ-1 Qth strongest coefficients
Alternatively, amplitude/phase can be replaced with real/imaginary
Alt5. Special case of Alt4: Q = 2, B0 = C0 = 3; B1 = C1 = 2 on amplitude/phase It can be seen that since quantization of $\tilde{W}_2$ is performed by determining one of the schemes of Table 9 above for each layer, the feedback overhead the feedback overhead increases linearly as much as the number of layers increases. Accordingly, the present disclosure proposes a technique of differentially configuring quantization for $\tilde{W}_2$ (the matrix of the LC coefficients) of each layer by considering an importance for each layer when the supported rank is 2 or more, and a CSI reporting method based thereon.

[Equation 3]

$$w = \begin{bmatrix} p_1 b_1 & \cdots & p_L b_L & 0 & & \\ 0 & & & p_{L+1} b_1 & \cdots & p_{2L} b_L \end{bmatrix} \begin{bmatrix} \overline{c_{1,1}} & \overline{c_{1,2}} & \cdots & \overline{c_{1,M}} \\ \overline{c_{2,1}} & \overline{c_{2,2}} & \cdots & \overline{c_{2,M}} \\ \vdots & \vdots & \ddots & \vdots \\ \overline{c_{2L,1}} & \overline{c_{2L,1}} & \cdots & \overline{c_{2L,M}} \end{bmatrix}$$

$$\begin{bmatrix} \exp(-j2\pi\omega_{1,1}) & \exp(-j2\pi\omega_{2,1}) & \cdots & \exp(-j2\pi\omega_{N_3,1}) \\ \exp(-j2\pi\omega_{1,2}) & \exp(-j2\pi\omega_{2,2}) & \cdots & \exp(-j2\pi\omega_{N_3,2}) \\ \vdots & \vdots & \ddots & \vdots \\ \exp(-j2\pi\omega_{1,M}) & \exp(-j2\pi\omega_{2,M}) & \cdots & \exp(-j2\pi\omega_{N_3,M}) \end{bmatrix}$$

Further, as in Table 10 below, a quantization scheme for non-zero coefficients of $\tilde{W}_2$ is determined.

TABLE 10

UE reports the following for the quantization of the one-zero coefficients in $\tilde{W}_2$
   A $\lceil \log_2 K_{NZ} \rceil$-bit indicator for the strongest coefficient index (l*, m*)
      Strongest coefficient $c_{l^*,m^*} = 1$ (hence its amplitude/phase are not reported)
   Two polarization-specific reference amplitudes.
      For the polization associated with the strongest coefficient $c_{l^*,m^*} = 1$, since the
      reference amplitude = 1, it is not reported
      For the other polarization, reference amplitude is quantized to 4 bits The alphabet is $\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0 \right\}$ (−1.5 dB step size)

For $\{c_{l,m}, (l, m) \neq (l^*, m^*)\}$:
   For each polarization, differential amplitudes of the coefficients calculated relative
   to the associated polarization-specific reference amplitude and quantized to 3 bits.

The alphabet is $\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}$ (−3 dB step size)

Note:
The final quantized amplitude $p_{l,n}$ is $p_{ref}(l, m) \times p_{diff}(l, m)$
Each phase is quantized to either 8PSK (3-bits) or 16PSK (4-bit) (configurable)

Referring to Table 10, a differential amplitude of an individual coefficient relatively calculated based on a reference amplitude for each antenna polarization may be expressed as 3 bits, and the differential amplitude and the reference amplitude are subjected to a product operation to become a finally quantized amplitude. The phase may be expressed by an 8PSK or 16PSK scheme utilizing 3 bits or 4 bits. A quantization scheme applied when reporting the CSI in a current standardization stage adopts the same scheme regardless of a configured/designated RI. Accordingly, a problem may occur in that when the RI is 3 or 4, the payload of the linear combination coefficient for each layer linearly increases.

In order to solve such a problem, proposed is a quantization operation of the amplitude/phase based on a quantization bit for each layer or each layer group in the quantization scheme of the non-zero coefficients of $\tilde{W}_2$ in Table 10 described above.

Part 1 CSI/Part 2 CSI described in the present disclosure may mean Part 1 UCI (or UCI Part 1)/Part 2 UCI (or UCI Part 2), Type II CSI Part 1/Type II CSI Part 2, and may correspond to each other.

Hereinafter, techniques/methods proposed in the present disclosure are just distinguished for convenience and it is needless to say that some components of any technique/method may be substituted with components of another technique/method or may be applied in combination with each other.

<Proposal 1>

In Proposal 1, proposed is a designing method considering characteristics of the channel information for each layer/for each rank indicator (RI) in quantizing $\tilde{W}_2$ (the matrix of the LC coefficients) constituted by a complex number. The quantization of the channel information means that each of a size and an angle is quantized after the size and the angle of the complex number value which is a channel information coefficient.

The UE may report, to the BS, information related to quantization for channel information (e.g., $\tilde{W}_{2,i} \in \mathbb{C}^{2L \times M_i}$, where i=1, . . . , RI) for each layer/for each RI. In this case, the quantization related information may be reported together with the CSI report (e.g., Type II CSI feedback) or while being included in the CSI report.

When V=TWTH is defined for the channel information (e.g., W) for each layer, if T is a unit matrix or an arbitrary matrix, each V is referred to as 'non-transformed CSI' or 'transformed CSI'. Hereinafter, a quantization and CSI feedback method will be described separately in the 'non-transformed CSI' (Case 1) and the 'transformed CSI' (Case 2).

<Case 1: Non-Transformed CSI>

By a 'non-transformed CSI' scheme, the UE may report quantization bit information (e.g., quantization bit allocation information/quantization scheme information) for the channel coefficient of each layer. Hereinafter, in Proposal 1-1, a method for reporting the quantization bit allocation information for each amplitude and phase of the channel coefficient for each layer/RI will be primarily described, and in Proposal 1-2, a method for reporting the quantization scheme information for each amplitude and phase according to the quantization bit information will be primarily described.

<Proposal 1-1>

Methods (e.g., Method 1 to 4) in which the UE performs quantization for coefficients included in $\tilde{W}_2$ of each layer and reports the quantized coefficients, in particular, method related to the quantization bit allocation information will be described in detail. When the rank to be supported is 2 or more, the quantization bit number of the channel information coefficient for each layer may be set equally/differently by an explicit or implicit scheme.

Method 1: Quantization Bit Number Setting Method of Implicit Scheme

A quantization bit number for coefficients may be set based on a correlation between the rank or the layer, and the quantization bit number. As the index of the layer becomes larger, the importance for the channel information of the corresponding layer becomes relatively smaller. By considering the characteristics, it is possible to implicitly configure the bit number for the coefficients by configuring the configured rank or layer index, and the quantization bit number as an inverse proportional relationship. The bit number which the coefficient of the channel information for each layer may have may be configured or indicated as a ratio with respect to a specific bit number (e.g., expressed as B) which is indicated or configured.

The bit number allocation for the amplitude coefficient and the phase coefficient may be configured uniformly/equally or configured as a different ratio with respect to the bit number of the corresponding coefficient. Alternatively, the bit number may be allocated to the amplitude coefficient to be WB-wise for each beam and the bit number may be differentially configured by a differential scheme to be SB-wise.

As a specific example, it is assumed that the bit number B=4, rank=4, a ratio for amplitude=[1, 3/4, 2/4, 1/4], and a ratio for phase=[1, 2/4, 1/4, 0] are configured/defined. Accordingly, it can be seen that the bit for the amplitude coefficient is {layer index, quantization bit number}={1,4}, {2,3}, {3,2}, {4,1} and the bit for the phase coefficient is {layer index, quantization bit number}={1,4}, {2,2}, {3,1}, {4,0}.

As an example, the ratio for the amplitude and the ratio for the phase may be predefined between the UE and the BS. When the bit number and the rank are configured by the BS or UE, the quantization bit numbers for the amplitude coefficient and the phase coefficient for each layer may be known. As another example, a plurality of ratios for the amplitude and a plurality of ratios for the phase may be configured/defined, and one of the plurality of ratios may be selected by using the index. When the bit number, the rank, and the index are configured by the BS or UE, the quantization bit numbers for the amplitude coefficient and the phase coefficient for each layer may be known.

In the implicit configuration method through Method 1 described above, a specific scheme or relationship is used for channel coefficients to be quantized, and as a result, bit overhead for quantization configuration may be reduced, and in particular, when a specific bit number B or the rank is large, it may be more efficient.

Method 2: Quantization Bit Number Setting Method of Explicit Scheme

Unlike Method 1 described above, the quantization bit number for each layer may be explicitly set. Further, in a situation in which the quantization bit number for each layer is given, the bit number may also be allocated differentially according to the amplitude of coefficient 4 in the corresponding layer.

As a specific example, the quantization bit number may be explicitly set like {layer index, bits for amplitude, bits for phase}={1, 3, 3}, {2, 2, 3}, {3, 2, 2}, {4, 1, 2}. As an example, the layer index, the bit number for the amplitude coefficient, and the bit number for the phase coefficient may be explicitly configured/defined between the UE and the BS. As another example, the BS may also explicitly indicate, to the UE, the layer index, the bit number for the amplitude coefficient, and the bit number for the phase coefficient through the CSI related configuration information. Alternatively, the UE may also report the layer index, the bit number for the amplitude coefficient, and the bit number for the phase coefficient jointly at the time of reporting the CSI.

In Method 2 described above, since the amount of quantization of channel coefficients may be specified for each layer, channel quality and an importance of the corresponding layer may be more flexibly reflected, and as a result, there is an advantage in that an accurate channel may be configured.

Method 3: Bit Number Setting Method Through Mode Configuration.

Method 3 above is a hybrid type configuration for quantization bit number setting methods of Implicit method 1 and Explicit method 2, and a bit number allocation operation for the amplitude and the phase of each coefficient may be preconfigured in multiple modes as in Table 11 below. Table 11 shows an example of a quantization bit number configuration method of the amplitude and the phase. Table 11 is just an example for convenience of the description and does not limit the technical scope of the present disclosure.

TABLE 11

|  | Amplitude | Phase |
| --- | --- | --- |
| Mode 1 | 'Fix' | 'Diff' |
| Mode 2 | 'Diff' | 'Diff' |
| Mode 3 | 'Diff' | 'Fix' |
| Mode 4 | 'Fix' | 'Fix' |

Referring to Table 11, when the amplitude or the phase is in a 'Fix' state, the quantization bit number may be designated from the BS or configured by the UE. When the amplitude or the phase is in a 'Diff' state, the quantization bit number may be configured based on Method 1 above or a separate bit allocation method may be configured. For example, the ratio is not configured for each layer or the bit number is not explicitly configured but a differential bit may be allocated by considering the layer index.

As in Table 11, there may be four modes in quantizing the coefficients (the amplitude coefficient and the phase coefficient) of $\tilde{W}_2$, For example, 'mode 4' indicates that the bit number is configured to the same quantization level by applying a specific quantization scheme (e.g., Alt1 to Alt5) to all layers as in discussed contents of Table 9 above.

As a specific embodiment, it is assumed that the bit number B=4, rank=4, mode=1, ratio=[1, 3/4, 2/4, 1/4], and 'even' are configured. Here, 'even' means that the bit number is configured equally/uniformly. That is, with respect to a given B value, the bit of the corresponding coefficient may be equally allocated to the B value for each layer. Since the amplitude is 'Fix' in 'mode=1', the bit for the amplitude coefficient may be represented like {layer index, quantization bit number}={1,4}, {2,4}, {3,4}, {4,4} and the bit for the phase coefficient is {layer index, quantization bit number}={1,4}, {2,3}, {3,2}, {4,1}.

Since the mode of the explicit or implicit quantization technique may be optionally configured through Method 3 described above, it may be efficient in a situation in which a configuration parameter for performing the quantization is dynamically configured.

Method 4: Bitmap Based Quantization Bit Number Setting Method (Method 4 may be utilized even in a valid region configuring method of Case 2 to be described below.)

The quantization bit number may also be configured differently for each coefficient with respect to $\tilde{W}_2$ (2L×M size) channel information (LC coefficient) of each layer. In this case, the bitmap for the SD/FD of the channel information is configured and indicated to select a channel coefficient(s), and the number of multiple bitmap groups may also be configured. As an example, the channel coefficient(s) may be selected by configuring the bitmap of the 2L×M size (e.g., the same size as $\tilde{W}_2$). Alternatively, a pre-defined bitmap or table in which the UE and the BS know the corresponding information may also be utilized.

For example, bitmap information may be configured for each of a row (e.g., the spatial domain SD) or a column (e.g., the frequency domain FD) of the channel information, and selection of the coefficient(s) therefor is available by a union or an intersection. In this case, if bitmap information of any one dimension is not specified, the UE and the BS may operate in a state in which all bitmap values are '1'. Alternatively, a bitmap configuration unit may be configured to a specific value rather than a current (one row/one column) and when a pre-defined region is utilized based on a configuration position, an effect of decreasing a bitmap configuration size may be acquired.

In this case, information (e.g., $K_0$) on the number of coefficient(s) selected through the bitmap is separately reported or calculated by utilizing the bitmap configuration to be utilized the SD/FD codebook configuration (e.g., Part 1 CSI).

The quantization bit number of the bitmap or the channel coefficient(s) designated through the bitmap may be configured differently or equally for each layer. When the bitmap or the quantization bit number is different, the corresponding information for each layer may be configured based on the implicit or explicit scheme. Here, in respect to an example of an implicit operation, in a situation in which the quantization bits of the amplitude and the phase are B, bit allocation depending on whether the bitmap is selected for each layer or within a specific layer may be configured by a differential scheme.

FIG. 8 illustrates an example of a bitmap based quantization method to which a method proposed in the present disclosure may be applied. FIG. 8 is just one example for convenience of the description and does not limit the technical scope of the present disclosure. In FIG. 8, it may be assumed that L=2, M=6, SD bitmap=(1101), FD bitmap=(110110), and 'intersection' are configured/pre-defined. In FIG. 8, a state in which an interaction part of the SD bitmap and the FD bitmap is 'ON' and the remaining part other than the intersection part is 'OFF' may be expressed. As an example, the UE may report, to the BS, the information such as the SD bitmap, the FD bitmap, etc. Alternatively, the information may be pre-defined between the UE and the BS.

For example, Rank=2, and in a situation of 'bitmap for each identical layer', {layer index, state, bits for amp., bits for phase}={1, 'ON', 4, 4}, {1, 'OFF', 3, 3}, {2, 'ON', 3, 3}, {2, 'OFF', 2, 2} may be configured based on FIG. 8.

It is possible to differently configure a quantization level of the channel coefficient(s) even in the identical layer through the bitmap configuration based on the above-described method, and a coefficient index and a region which influence channel accuracy may be configured, and as a result, a quantization effect for each layer/between layers may be remarkably enhanced. That is, the quantization bit number may be differently configured for the $\tilde{W}_2$ (2L×M) channel information of each layer for each layer/for each coefficient based on the bitmap.

<Proposal 1-2>

Proposed specifically are a method in which the UE performs quantization coefficients (e.g., the amplitude coefficient, the phase coefficient, etc.) themselves included in $\tilde{W}_2$ for each layer or for each layer group, and reports the quantized coefficients to the BS, in particular, methods related to quantization scheme information. The quantization scheme may be replaced with the configuration, the mode, etc., for quantization, and expressed.

The channel information of each layer may be configured to correspond to the quantization scheme of Table 10 above by utilizing quantization bit information configured for each layer or for each layer group. For example, as described in Table 10, the differential amplitude may be quantized to a −3 dB step with 8 values utilizing 3 bits $$\left(\text{e.g.}, \left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}\right).$$

Hereinafter, in the present disclosure, an example in which the differential amplitude is quantized with 3 bits like the example will be primarily described. A set of the differential amplitudes based on the 3-bit quantization may be constituted by 8 values $$\left(\text{e.g.}, \left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}\right).$$

In this case, when the quantization bit for the amplitude In this case, when the quantization bit for the amplitude coefficient is configured to 2 bits, the operation needs to be performed by configuring an amplitude subset constituted by 4 values selected from the set of the differential amplitudes.

This may correspond even to a phase quantization scheme configuration, and may also be mapped by a specific phase shift keying (PSK) technique according to the bit number. For example, when as each quantization bit number for the phase coefficient, 2, 3, or 4 bits are allocated, it may be promised/defined that the quantization of the phase operates as (4, 8, 16)-PSK.

In Proposal 1-2 in the present disclosure, for convenience of description, the example of the quantization for the amplitude coefficient will be primarily described, but does not limit the technical scope of the present disclosure. Accordingly, the quantization scheme proposed in the present disclosure may be applied only to the quantization of the amplitude coefficient, or applied only to the quantization of the phase coefficient or applied to both amplitude and phase quantization. Further, different schemes (e.g., prescribed methods) may be applied to quantization for each element.

Hereinafter, the quantization scheme for the amplitude coefficient or the phase coefficient for each RI or layer/layer group will be described in detail.

Table 12 shows an example of quantization bit and quantization scheme configuration for the amplitude and the phase for each RI and layer/layer group.

TABLE 12

| RI | Layer | Amplitude | | Phase | |
| --- | --- | --- | --- | --- | --- |
| | | Bits | Scheme | Bits | Scheme |
| 1 | 0 | 3 | 'Differential amplitude set' | 3 | 'PSK' |
| 2 | 0 | | | | |
| | 1 | | | | |
| 3 | 0 | 3 | 'Differential amplitude set' | 3 | 'PSK' |
| | 1 | | | | |
| | 2 | 2 | 'Bitmap' | | |
| 4 | 0 | 3 | 'Differential amplitude set' | 3 | 'PSK' |
| | 1 | | | | |
| | 2 | 2 | 'Bitmap' | 2 | 'PSK' |
| | 3 | | 'Bitmap' | | 'PSK' |

Referring to Table 12, when the RI is 1 or 2, the quantization bit number and the quantization scheme for the amplitude and the phase may be equally configured commonly for each layer. However, when the RI is 3 or 4, the quantization schemes of the amplitude and/or the phase may be configured differently for each RI. For example, when the RI is 3, the phase quantization bit number for layer 2 is 3, while when the RI is 4, the phase quantization bit number for layer 2 is 2. Further, when the RI is 3 or 4, the quantization schemes of the amplitude and/or the phase may be configured differently for each layer. For example, when the RI is 3, the amplitude quantization bit number for layer 1 may be 3 and the corresponding scheme may be a 'differential amplitude set' scheme, while when the amplitude quantization bit number for layer 2 may be 2 and the corresponding scheme may be a 'Bitmap' scheme.

As described above, the quantization bit numbers and/or the quantization schemes of the amplitude and the phase may be different for each RI, and even though the identical RI is configured, the quantization bit number and/or the quantization scheme may be each indicated differently for each layer/layer group. In this case, the bit number and the quantization scheme are explicitly indicated for each layer/layer group for the configured/indicated RI or an indicator such as 'common' or 'specific' is provided to configure a parameter so as to follow a pre-defined rule associated with the corresponding indicator.

Values for the bit numbers and the quantization schemes of the amplitude and the phase for each RI and each layer of Table 12 above are just one example for convenience of description, and do not limit the technical scope of the present disclosure. Accordingly, the quantization bit number and the quantization scheme according to a rank indicator (RI) and a layer indicator (LI) (or for each layer/layer group) may be expressed/applied as a combination/coupling of the quantization bit number/scheme mentioned in the quantization bit number configuration related methods (e.g., Methods 1 to 4) of Proposal 1-1 described above and the quantization information schemes (e.g., Alt 1 to Alt 4) of Proposal 1-2 described below, in addition to the values shown in Table 12.

The UE may report, to the BS, the quantization scheme information. For example, when the UE reports, to the BS, the quantization scheme information through UCI (or Type II CSI feedback) part 1 field, a field for the quantization scheme information may not be constituted for a UE constituted by 2 Rxs or less, and the corresponding field may be constituted and reported for a UE which is constituted by more than 2 Rxs. Further, the quantization scheme information included in the UCI may follow a capability of the UE. For example, when the UE capability which the UE reports to the BS supports an RI of 3 or more (RI=3, 4, . . . ), the quantization scheme information is included in the UCI and if not (e.g., RI=1, 2) (without reporting separate quantization bit number/scheme related information), the quantization may be performed based on the quantization bit number/scheme when the RI of Table 12 is 1 or 2.

As described above in Table 10, etc., the quantization of the amplitude coefficient may be performed based on a reference amplitude set and a differential amplitude set. Specifically, it is assumed that the reference amplitude is quantized with 4 bits, and a set of the reference amplitudes is constituted by $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}.$$

Further, it is assumed that the differential amplitude is relatively calculated base don the reference amplitude and quantized with 3 bits, and the set of the differential amplitudes is constituted by $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{4\sqrt{2}}\right\}.$$

Hereinafter, the present disclosure proposes schemes constituting a subset according to the quantization bit configuration for the reference amplitude set and the differential amplitude set of the quantization scheme. Schemes described below may be generally divided into an explicit scheme (e.g., Alt 1) and an implicit scheme (e.g., Alt 2, Alt 3, and Alt 4). Further, each scheme (e.g., Alt 1 to Alt 4) may be independently applied or one or more schemes may also be applied in combination with or by coupling with each other. Further, Part 1 CSI and/or Part 2 CSI mentioned in the following schemes may be described with reference to Proposal 2 to be described below.

Alt 1) Bitmap Based Quantization Scheme Information Configuration Method (Explicit Scheme)

A method for directly indicating/configuring the quantization scheme information by utilizing the bitmap when constituting a quantization subset (i.e., a subset of the differential amplitude set) according to the quantization bit information may be considered. For example, as described above, the set of the differential amplitude based on the 3-bit quantization may be constituted by 8 values (e.g.), and when the quantization bit is configured to 2 bits for the set of the differential amplitude, bits corresponding to 4 values among 8 values may be configured to 1 by using bitmap type information. As an example, the subset may be indicated to be constituted like $$\left\{1, \frac{1}{\sqrt{2}}, \frac{1}{2\sqrt{2}}, \frac{1}{8}\right\}$$

based on a bitmap (11010010) (e.g., the subset is constituted by values corresponding to 1 among 8 values).

The BS may notify, to the UE, the bitmap type information through higher layer signaling such as RRC, MAC-CE, etc. Alternatively, the UE may report, to the BS, the quantization scheme used/determined by the UE, which is included in Part 1 CSI in the bitmap type. Alternatively, the quantization scheme may be included in Part 2 CSI and reported, and in this cased, the operation may be performed by determining a bit width (a field size (bit width) of a bitmap to be transmitted through Part 2 Type II CSI) of the bitmap for each corresponding layer or layer group for an RI configured/indicated so as to secure a transmission space of Part 2 CSI.

The quantization scheme may also be configured differently for each coefficient for $\tilde{W}_{2,i}$ (2LXMi) channel information for each layer. $\tilde{W}_{2,i}$ is constituted by linear combination coefficients of the SD basis and the FD basis, the bitmap for the SD basis/FD basis is configured or indicated to select the linear combination coefficient(s) of the channel information, and it is also possible to configure the number of multiple bitmap groups. For example, bitmap information may be configured for each of a row (e.g., the SD basis) or a column (e.g., the FD basis) of the channel information, and selection of the coefficient(s) therefore is available by a method such as a union or an intersection. In this case, if bitmap information of any one dimension is not specified, the UE and the BS may operate in a state in which all bitmap values are '1'.

For example, when an SD bitmap (0100) and an FD bitmap (1010) are configured/indicated channel information (i.e., each coefficient may correspond to (1,1), (1,2), ..., (4,4)) having a 4×4 size, a coefficient corresponding to an intersection of 1 may indicate a coefficient(s) corresponding to (2,1), (2,3), and the quantization scheme may be applied differently for each indicated coefficient. As an example, only the coefficient(s) corresponding to the indicated (2,1), (2,3) may be quantized based on the subset of the set of the differential amplitudes. Another quantization scheme may be applied to the remaining coefficients or the remaining coefficients may not be quantized.

Alternatively, a pre-defined bitmap or table in which the UE and the BS know the corresponding information may also be utilized. For example, the bitmap for the quantization may be pre-defined for each quantization bit configuration (e.g., 1 bit, 2 bits, etc.), and the quantization for the amplitude coefficient may be performed based thereon.

Further, a bitmap configuration unit may be configured to a specific value rather than a current one row/one column and when a pre-defined region is utilized based on a position of the configured specific value, an effect of decreasing a bitmap configuration size may be acquired. For example, coefficients included in the pre-defined region may be quantized based on the position based on information indicating a position of a specific coefficient.

The quantization scheme of the bitmap or the channel coefficient(s) designated through the bitmap may be identical or different for each layer/layer group. When the quantization scheme is different for each layer/layer group, the corresponding information (i.e., quantization scheme information) for each layer/layer group may be configured by an explicit or implicit scheme. As an example of the implicit scheme, in a situation in which the quantization bits of the amplitude and the phase are B, bit allocation depending on whether the bitmap is selected for each layer or within a specific layer may be configured by a differential scheme.

It is possible to differently configure the subset for the quantization of the channel coefficients even in the identical layer based on the bitmap type information through the above-described proposal method, and a coefficient index and a region which influence channel accuracy may be configured, and as a result, a quantization effect for each layer or between layers may be remarkably enhanced.

Alt 2) Offset Based Quantization Scheme Configuration (Implicit Scheme)

When the subset is constituted based on the quantization bit information configured/indicated in the set of the differential amplitude for the quantization scheme of Table 10 above, the operation may be performed by constituting subsets which are as many as states corresponding to the quantization bit information starting from the offset position.

For example, when the offset value is configured to 0 and the quantization bit is 2 bits, the subset may be constituted by $$\left\{1, \frac{1}{\sqrt{2}}, \frac{1}{2}, \frac{1}{2\sqrt{2}}\right\}$$

constituted by four upper values in the set of the differential amplitudes, $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Further, when the offset value is configured to 2 and the quantization bit is 2 bits, the subset may be constituted by four values such as $$\left\{\frac{1}{2}, \frac{1}{2\sqrt{2}}, \frac{1}{4}, \frac{1}{4\sqrt{2}}\right\}.$$

The quantization of the amplitude coefficient may be performed based on the constituted subset. In this case, as compared with Alt 1 which is an amplitude subset constitution scheme using the bitmap, there is efficiency in that an amplitude subset may be constituted only by a payload for the offset by utilizing already configured quantization bit information.

In order to increase a flexibility for effective application of the scheme and quantization subset constitution, the operation may also be performed by designating the offset and the number of subset components based on a rule pre-defined between the UE and the BS. As an example, the offset and the number of subset components may be designated based on a pre-defined table (e.g., a 4-bit table), and the UE may constitute the subset and perform the quantization based on the offset and the number of subset components which are designated.

A particular limit may not be set on the configuration of the offset value. In this case, when the state of the subset according to the quantization bit allocated according to the offset value may not be filled, the operation may be performed by configuring the state to '0' or 'reserved' according to a specific scheme. Here, the state may mean a value of the component of the subset, a position of the component, or an i-th component (or value). For example, when the offset value is 5 and the quantization bit is 2, the subset may include four components (values), and three values among the four values may be constituted by referring toe value of the differential amplitude set, and in respect to one last state, the subset may be constituted by $$\left\{\frac{1}{4\sqrt{2}}, \frac{1}{8}, \frac{1}{8\sqrt{2}}, 0\right\} \text{ or } \left\{\frac{1}{4\sqrt{2}}, \frac{1}{8}, \frac{1}{8\sqrt{2}}, \text{'reserved'}\right\}$$

by applying the above-described scheme.

In the above example, when the state is configured to 'reserved', the UE may reduce a bit number corresponding to 'reserved'. For example, when two states of the subset are 'reserved', it is sufficient to transmit the quantization information even by transmitting only 1 bit, it may be promised that a quantization bit width of the coefficient is reduced (implicitly). In this case, since the payload of Part 2 CSI may be varied, the information is included in Part 1 CSI and transmitted, thereby removing ambiguity.

Alternatively, a limit may also be set on the offset value. For example, a differential amplitude set constituted by N bits may be configured to use a value which does not exceed $2^{N-1}-1$ as the offset value or a specific offset value may be explicitly configured. When the UE limits and configures the offset value according to the above-described method, the UE may report, to the BS, information on the offset value to be included in Part 1 or Part 2 CSI.

Alt 3) Comb-Type Based Quantization Scheme Configuration (Implicit Scheme)

The Alt 2 scheme is a method for continuously constituting the state(s) corresponding to the quantization bit allocated based on the offset, while the Comb-type is a scheme which operates based on a pattern of 'even' or 'odd'. The quantization scheme may be configured by utilizing the offset similarly even with respect to the Comb-type based quantization scheme.

For example, when the offset value is 0, the quantization bit is 2, and the pattern is 'odd', the subset may be constituted by four values constituted by $\{1, \frac{1}{2}, \frac{1}{4}, \frac{1}{8}\}$ in the differential amplitude set $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

The quantization of the amplitude coefficient may be performed based on the subset.

When the value (i.e., the component) of the subset is constituted in the Comb-type pattern configured based on the offset value, if the value may not be referred to from the differential amplitude as many as the states according to the quantization bit, the value of the corresponding position is configured to '0' or 'reserved' or components corresponding to a largest index among values not included in the Comb-type pattern are sequentially selected to constitute the subset. For example, in the above example, when the offset value is 3, three values, $$i.e., \left\{\frac{1}{2\sqrt{2}}, \frac{1}{4\sqrt{2}}, \frac{1}{8\sqrt{2}}\right\}$$

are selected from $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}$$

and a value of '⅛' corresponding to the largest index among the values not included in the pattern is used to constitute the subset. Alternatively, a smallest index may be used instead of the largest index, and as a result, components corresponding to the smallest index are sequentially selected to constitute the subset.

Further, the subset may be constituted differently based on a Comb-size. The UE may report, to the BS, the Comb-size and the offset or the UE may signal, to the UE, the Comb-size or the offset. For example, when it is assumed that the differential amplitude set is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\},$$

the offset is 0, and the Comb-type is the 'odd' pattern, if the comb-size is 3 (Comb-3), the subset may be determined as $$\left\{1, \frac{1}{2\sqrt{2}}, \frac{1}{8}\right\}$$

and if the comb-size is 4 (Comb-4), the subset may be determined as $\{1, \frac{1}{4}\}$.

Even when the subset is constituted based on the Comb-size, if the component of the subset may not be referred to as many as the states according to the quantization bit with the configured Comb-size, Comb-type pattern, etc., the value of the corresponding position is configured to 'o' or 'reserved' or the components corresponding to the largest or smallest index among values not included in the comb-type pattern are sequentially selected to constitute the subset. For example, in the example of the case where the Comb-size is 4, the subset may be constituted as $\{1, \frac{1}{4}, 0, 0\}$ or the components corresponding to the largest index are sequentially selected to constitute the subset as $$\left\{1, \frac{1}{4}, \frac{1}{8\sqrt{2}}, \frac{1}{8}\right\}.$$

In applying the Comb pattern, the number of states which belong to the pattern and the number of states which do not belong to the pattern may also be configured equally or differently. When the 'odd' pattern in which the number of states which belong to the pattern and the number of states which do not belong to the pattern are equal to each other is taken as an example (e.g., the number of states=2), the amplitude set may be configured to $$\left\{1, \frac{1}{\sqrt{2}}, \frac{1}{4}, \frac{1}{4\sqrt{2}}\right\} \text{ in } \left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Accordingly, the resulting configuration for the number of states may be explicitly reported or the operation according to a pre-defined scheme may be possible.

Alt 4) Quantization Scheme Configuration Through Inter-Quantization Value Step-Size Adjustment (Implicit Scheme)

The schemes of Alt 1 to Alt 3 are schemes of constituting the subset according to the quantization bit configured/indicated based on the set of the differential amplitudes in the quantization scheme of Table 10, while the quantization scheme through the step-size adjustment in Alt 4 is a scheme of constituting the subset by being configured with a difference between the values of the states according to the quantization bit. All of the respective states (components) constituting the set of the differential amplitudes in Table 10 are configured to −3 dB step-size. Accordingly, if the step-size is designated, a new amplitude set may be generated or an amplitude set according to a plurality of step-sizes may be configured without referring to the existing set of the differential amplitudes, and the quantization may be performed based thereon.

For example, when the step-size value is (−1.5 dB, −3 dB, −4.5 dB, −6 dB) and the quantization bit is configured, each state generated according to the quantization bit may be generated as large as the corresponding step-size based on '1'. In other words, as the state generated according to the quantization bit, the amplitude set constituted by values to which a step-size is applied as large as 2^(the number of quantization bits) based on '1' may be generated. For example, as the step-size value, one value which becomes a reference may be indicated, and the amplitude set may be constituted by applying a step-size corresponding to a multiple of one value which becomes the reference for each state.

A quantization table may be constituted which may be configured by utilizing some or all of two parameters for the step-size and the bit width or the operation may also be performed based on the pre-defined table mentioned in the above-descried offset based quantization scheme configuration of the Alt 2. In this case, some or all of the two parameters may be configured by the BS or reported to the BS by the UE.

The component of the subset in the above-described proposal methods (e.g., Alt 1 to Alt 4) of Proposal 1-2 may be replaced/mixed with an expression such as the value or the state, and used. Further, the number of components of the subset may be determined based on the quantization bit number. For example, when the quantization bit for the amplitude coefficient is configured to n bits (n is a natural number), the number of components of the subset may be $2^n$. The number of components of the set of the differential amplitudes may be $2^n$ or more, and the component of the subset may be selected among them.

When the quantization bit number/quantization scheme may be applied differently for each layer/layer group through the above-described proposal method, and as a result, an uplink overhead reduction effect may be acquired in particular when the RI is 3 or more.

Further, the above-described methods (e.g., Alt 1 to Alt 4) related to the quantization scheme information of Proposal 1-2 may be applied even to transformed CSI of Case 2 to be described below.

<Case 2: Transformed CSI>

Unlike the existing CSI codebook design, an operation of compressing multiple contiguous or continued sub band (SB) channel information in the frequency domain (FD) is additionally performed in the enhanced Type II CSI codebook. Accordingly, if the quantization technique is designed by considering an influence of a correlation in terms of the FD, the payload may be reduced with higher efficiency, and as a result, a 'transformed CSI' report of Case 2 is proposed. That is, when a specific transform is performed for the channel information, there is a feature that a valid value(s) is concentrated and expressed on a specific region(s) of the channel information, and as a result, quantization levels for valid components of the channel coefficients for each layer may be differently configured by using the transformed channel information. For example, accuracy of coefficients included in a valid region is increased by allocating a lot of quantization bits and the quantization is performed by allocating a small number of bits to the remaining coefficients or the remaining coefficients may be processed by a scheme such as configuring to 0, etc.

As an example of the transform scheme, Discrete Cosine Transform (DCT) as a Fourier based transform technique may express/transform signal and video information expressed by a real number into information on the frequency domain. In this case, the signal information shows an energy concentration property in which the signal information is concentrated primarily on a low frequency component due to the property of the DCT, and such a tendency increases as a correlation degree of the corresponding information becomes larger. Accordingly, in regard to an advantage of the DCT, since specific information may be expressed by utilizing some values corresponding to the low frequency component, the DCT may have high efficiency in quantizing or reporting the information. Equation 4 shows DCT matrix C for transformation of 2D signal information M expressed as a priority matrix.

$$[C]_{nm} = \begin{cases} \frac{1}{\sqrt{K}}, & n = 0 \\ \sqrt{\frac{2}{K}} \cos \frac{\pi(2m+1)n}{2K}, & n = 1, ..., K-1 \end{cases}$$
[Equation 4]

$$m = 0, ..., M - 1$$

In this case, transformed signal information V may be calculated by V=CMC T. Even when an original signal is intended to be restored from the transformed signal, a scheme of M=C TVC may be performed through the DCT matrix C.

FIG. 9 illustrates an example of energy concentration characteristics on channel information transformed based on DCT. When the DCT is performed for signal or image information (8×8) expressed by a left real-value in FIG. 9, a right result may be acquired. That is, a transformed main value is concentrated and distributed on a low frequency domain, and with a higher frequency, a value magnitude of the component may be remarkably reduced.

The DCT is just one of various transform schemes, and does not limit the technical scope of the present disclosure. The channel transform scheme of the present disclosure may adopt various schemes in addition to the DFT, the DCT, etc.

Accordingly, a method for differentially performing the quantization by considering the transform scheme of the channel information may be considered.

As the 'transformed CSI' scheme of Case 2, the UE may report information including at least one of information i) to iii) below. i) Channel transform information of each layer, ii) valid value or valid region configuration information for the transform channel for each layer, and in this case, a magnitude of the valid value and order information for the transform channel may be included. iii) Quantization bit information (e.g., 'quantization bit allocation information' or 'quantization scheme information'), and in this case, a size of a transform channel coefficient corresponding to the valid region and phase-specific quantization bit allocation information and/or a size according to the quantization bit information and phase-specific quantization scheme information may also be based on the methods (Proposals 1-1 and 1-2) of 'non-transformed CSI' of Case 1 above or configure a separate operation. Hereinafter, information i) to iii) will be described in detail.

For convenience of description, information i) to iii) is separately described, but does not limit the technical scope of the present disclosure, and information i) to iii) may be combined and applied, of course.

i) Channel Transform Information of Each Layer

Since valid values of the channel information are influenced by a position and a range according to an attribute of a transform matrix (e.g., DFT, DCT, an orthogonal basis, etc.), the UE and the BS may be indicated/configured to share the corresponding channel transform information. Alternatively, as the transform matrix, a pre-defined matrix may be used. As an embodiment of applying the transform matrix, a matrix $\bar{X}$ transformed for transform matrices T1 and T2, and channel information matrix X (M by K) may be expressed as $\bar{C}=T_1^H X T_2$, and each corresponding information may be configured or indicated.

ii) Valid Value or Valid Region Configuration Information for Transform Channel for Each Layer CSI feedback valid range configuration information may classify the operation according to an estimation scheme indicated by the UE or the BS based on channel information transformed through the channel transform information (e.g., transform matrix information). For example, when the magnitude of each coefficient is smaller than a specific threshold, each coefficient may be processed as 0 and when the magnitude of each coefficient is equal to or larger than the specific threshold, each coefficient is considered as the valid to configure whether there is the valid value.

FIG. 10 illustrates an example of a method for configuring a valid region for the channel information transformed by a DCT scheme to which method and/or an embodiment proposed in the present disclosure may be applied. In FIG. 10, it is assumed that the channel information is expressed as a matrix having a size of 9×9. FIG. 10 is just one example for convenience of the description and does not limit the technical scope of the present disclosure.

Referring to FIG. 10, the DCT is applied to the transform matrix by extracting a real or imaginary part for the channel information (e.g., 9×9 size), and then the information on the valid region may be extracted based on a threshold. A valid component of the real/imaginary part of the channel information may be effectively extracted by using the energy concentration property of the DCT. Pi represents an index (i.e., an i-th valid region) of the valid region (here, i may be separately configured by the UE/BS or adopt a pre-defined value), and in this case, the number of Pis for each layer/a range for each Pi may be configured equally or differently. As an example, in the case of rank=2 and 'DCT', {layer index, the number of Pis, range}={1, 4, [3,2,2,2]}, {2, 2, [2,7]} may be expressed.

Since meaningful channel coefficients for each layer are concentrated on the low frequency domain (e.g., P0 region) by the energy concentration property of the DCT transform, the above-described method may be very advantageous for differently configuring the quantization of the coefficient in the layer.

FIG. 11 illustrates an example of a method for configuring a valid region for the channel information transformed by a DFT scheme to which a method and/or an embodiment proposed in the present disclosure may be applied. In FIG. 11, it is assumed that the channel information is expressed as a matrix having a size of 9×9. FIG. 11 is just one example for convenience of the description and does not limit the technical scope of the present disclosure.

Referring to FIG. 11, the valid region is may be configured by a position for a specific element for the channel information matrix and a specific range based on the position. As an example, the specific element may mean one of the valid values, and the position for the specification element may be represented by an index (e.g., an index in the matrix) of one of the valid values. The specific range may have a radius having a value of R or may be configured to an R×R region around the position of the specific element. Alternatively, by designating regions of a form pre-promised between the BS and the UE by indices, the corresponding valid region may also be configured based on the reported position of the specific element.

The UE may report region information in which the valid component exists, i.e., the position of the specific element and range information of the corresponding valid region, and in this case, the number of/ranges of valid regions for each layer may be equally or differently configured. As an example, in the case of rank=2 and 'R×R size', {layer index, position, R}={1, (2,2), 5}, {2, (6,6), 3} may be expressed. As an example, the UE may report the layer index, the position (the index in the matrix) of the specific element, and information (e.g., an R value, an index related to a range, etc.) related to the valid region arrange.

Since the DCT is a transform for the real value, each of a real part value and an imaginary part value should be transformed and reported with respect to the channel coefficients, while since the DFT is a complex number transform, the DFT may be directly applied to the matrix of the channel coefficients, and as a result, the DFT may have an advantage in terms of processing.

iii) Quantization Bit Information for Each Valid Region

In respect to channel information subjected to a specific transform for each layer, the magnitude of the transform channel coefficient and the phase-specific quantization bit allocation information corresponding to the valid region may be based on Methods 1 to 4 of Proposal 1-1, Alt 1 to Alt 4 of Proposal 1-2, etc., or a separation operation may be configured.

The quantization method for each corresponding layer designated/configured may be performed for the channel coefficients which belong to the valid region, and the value may be replaced with 0 for the remaining region or a quantization method for a part other than the valid region may be explicitly/implicitly configured.

As an example, in a situation in which the transform is configured to 'DCT', quantization bit information for regions indicated by P0 to P3 of a first layer may be configured like {Pi, bit for amplitude, bit for phase}={P0, 3, 3}, {P1, 3, 2}, {P2, 2, 2}, {P3, 0, 0}. The UE may quantize an amplitude coefficient and a phase coefficient of region P0 to 3 bits and report quantized bits to the BS, and since the amplitude coefficient and the phase coefficient of region P3 are 0 bit, the UE may not report the corresponding amplitude coefficient and phase coefficient of region P3.

The above-described method and/or embodiments of Proposal 1 may be extensively applied even to CSI report of multi-TRPs and the UE which operates. For example, the layer of Proposal 1 described above may correspond to each TRP. Hereinafter, for convenience of description, a situation in which two TRPs (e.g., TRP1 and TRP2) operate is assumed. However, such an assumption does not limit the technical scope of the present disclosure. Here, the TRP may be replaced with a term such as the TP, the BS, etc.

During the CSI report for TRP1 and TRP2, quantization for each CSI report may be performed.

For example, based on Method 1 of Proposal 1 described above, quantization bit numbers for the CSI report for TRP1 and the CSI report for TRP2 may be implicitly configured. The quantization bit number of each CSI report may be configured as a ratio. For example, based on Method 1 of Proposal 2 described above, quantization bit numbers for the CSI report for TRP1 and the CSI report for TRP2 may be explicitly configured. For example, based on Method 1 of Proposal 3 described above, quantization bit numbers for the CSI report for TRP1 and the CSI report for TRP2 may be defined/configured for each mode. For example, based on Method 1 of Proposal 4 described above, quantization bit numbers for the CSI report for TRP1 and the CSI report for TRP2 may be configured in the bitmap type.

For example, based on Case 2 of Proposal 1 described above, at least one of i) channel transform information for each CSI report, ii) a valid value or valid region configuration information (in this case, may include the magnitude of the valid value and the order information for the transform channel) for the transform channel for each CSI report, or iii) the quantization bit information for each valid region may be included.

Further, as in contents described in Proposal 2, In the Type II CSI feedback considered in Rel-16 NR MIMO, a scheme of expressing the channel information is different from the existing Type II CSI. That is, for each layer, based on the SD basis and the FD basis, the channel or channel information is constituted by $\tilde{W}_2 \in \mathbb{C}^{2L \times M}$ which is linear combination information for the SD basis and the FD basis. Due to such a change, presented is a need for designing UCI suitable for the Rel-16 Type II CSI codebook by additionally considering a parameter and an indicator required for constituting and decoding the channel. By such a point, hereinafter, Proposal 2 will be proposed.

<Proposal 2>

As described above, in the enhanced Type II CSI feedback, the channel information may be constituted by $\tilde{W}_2 \in C^{2L \times M}$ which is linear combination information for the SD basis and the FD basis based on the SD basis and the FD basis for each layer differently unlike the existing scheme. It is necessary to design UCI suitable for the enhanced Type II CSI codebook by additionally considering the parameter and the indicator required for constituting and decoding the channel.

During the CSI report using the Type II CSI codebook, the UCI may be configured to include Part 1 CSI and Part 2 CSI.

Part 1 CSI may include at least one of indication KNZ (≤K0) for the number of non-zero coefficients in W2, indication NS (NS value may configure or be may be indicated with a range of 1≤NS≤2L) for the number of strong coefficients among K0 coefficients, and a configuration/mode (may include 'quantization bit allocation information' (e.g., see Proposal 1-1)/'quantization scheme information' (e.g., see Proposal 1-2) for each layer/layer group).

Part 2 CSI may include at least one of a bitmap indication for KNZ and indices for NS coefficients (e.g., ceil(log 2 K0)). Specifically, the bitmap indication for KNZ may follow a scheme such as unrestricted, pol-common, restricted, etc. As an example, in the unrestricted scheme, the bitmap may have a size of 2L×M. Further, when the corresponding indication is included in Part 1 CSI, KNZ and NS of Part 1 CSI are replaced. When NS is 1, the corresponding index may be included in Part 1 CSI.

For example, the bitmap indication for KNZ may correspond to a bitmap having a size of 2L×M for the coefficients of $\tilde{W}_2 \in C^{2L \times M}$, and may be reported through Part 2 CSI (i.e., UCI part 2). Since the size of the bitmap may be dynamic, it may be more preferable that the bitmap indication for KNZ is reported through Part 2 CSI in which the size is dynamic than Part 1 CSI in which the size is static. As a specific example, a channel coefficient(s) (e.g., non-zero coefficient) reported based on a bitmap configured to a size which is as large as a product between the number (e.g., 2L) of bases of a spatial domain and the number (e.g., M) of bases of the frequency domain may be selected/indicated.

The size of Part 1 CSI may be static and Part 2 CSI may be dynamic. Part 1 CSI may be configured by a value capable of determining the size of Part 2 CSI. In this case, each part according to Proposal 2 above may be constituted, which includes some or all of components in each part included in the existing Rel-15 UCI.

Further, in selecting a basis/coefficient subset for a first layer, a subset design having a size of $K_0$ may be selected from i) an unlimited subset (size=2LM), ii) a polarization-common subset (size=LM), or iii) a restricted subset (a subset of given beams and FD criterion, size=2L+M). A value of $K_0$ may be represented as $K_0 = \lceil \beta \times 2LM \rceil$, and here, β of two values may be supported. The value of $K_0$ may be selected from β∈{⅛, ¼, ½, ¾}. The UCI is constituted by two parts. Information pertaining to the number(s) of non-zero coefficients is reported in UCI part 1. This does not mean whether the information is constituted by a single value or multiple values. Further, a payload of UCI part 1 is equally maintained for different RI value(s). The bitmap is used for representing non-zero coefficient indices.

An LC coefficient associated with a beam l∈{0, 1, ..., 2L−1} and a frequency unit m∈{0, 1, ..., M−1} is expressed as $c_{l,m}$, and a strongest coefficient (among $K_{NZ}$ non-zero coefficients reported by using the bitmap) is expressed as $c_{l^*,m^*}$. The following alternatives are classified/simplified.

Alt1 (per coefficient analogous to Rel. 15 Type II $W_2$): Rel. 15 3-bit amplitude, N-bit phase, here, N is configured to 2 (QPSK), 3 (8PSK), or 4 (16PSK) (configurable). A $\lceil \log_2 K_{NZ} \rceil$-bit indicator for the strongest coefficient index (l*, m*) is reported.

Alt2' (combined): The UE may report the following for quantization of coefficients in $\tilde{W}_2$.

i) Strongest coefficient indicator: $\lceil \log_2 K_{NZ} \rceil$ bits, here, $K_{NZ}$ is equal to the number of NZ coefficients reported by using the bitmap. The strongest coefficient is expressed as 1 (therefore, an amplitude/phase of thereof is not reported).

ii) Two reference amplitudes (for two polarizations): For polarization of the strongest coefficient, a reference amplitude is 1 (therefore, not reported). For another polarization, the reference amplitude is quantized to A (A=4 or 3) bits. For A=4, an alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}$$

(−1.5 dB step size) and for A=3, the alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{6}}\right)^{\frac{1}{4}}, 0\right\}$$

(−1.5 dB step size).

iii) differential amplitudes of the coefficients w.r.t. the reference amplitude in this polarization The differential amplitude is quantized to B (B=2 or 3) bits. For B=2, the alphabet is $$\left\{1, \frac{1}{\sqrt{2}}, \frac{1}{4}, \frac{1}{2\sqrt{2}}\right\}$$

(−3 dB step size) and for A=3, the alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}$$

(−3 dB step size).

iv) (A, B) is configurable among (4, 2), (4, 3), and (3, 2).

v) Each phase is quantized to C=3 bits (8PSK) or 4 bits (16PSK), and configurable.

Alt3. A coefficient matrix $\tilde{W}_2$ (2L-by-M matrix) may be expressed as a product of three matrices (=ABC). A and C are real-valued diagonal matrices, and B is a coefficient matrix. An amplitude set of B is {0, 1}. Amplitude set of A and C: Alt 3A: 3 bit R15 amplitude set for A and C or ii) Alt 3B: 3 bit R15 amplitude set for A and new 2 bit amplitude set {0, ¼, ½, 1} for C.

Alt4. For each beam l: 4-bit amplitude and 16PSK phase for an coefficient of a first FD component and 3-bit amplitude and 8PSK phase for the remaining coefficients.

Alt4M (modified Alt4).

4-bit amplitude and 16PSK phase for $\{c_{l,m^*}, l \neq l^*\}$, 3-bit amplitude and 8PSK or 16PSK phase (configurable) for $\{c_{l,m}, m \neq m^*\}$, and the $\lceil \log_2 K_{NZ} \rceil$-bit indicator for the strongest coefficient index are reported.

Table 13 is an alternative(s) for a W2 channel information configuration of the enhanced Type II CSI feedback discussed in NR MIMO. The CSI report based on each scheme may be effectively performed by utilizing the proposed new UCI design. For example, L=4, M=7, beta=$\{\frac{1}{4}, \frac{1}{2}\} \rightarrow K_{NZ}=$beta$*2*L*M=\{14, 28\}$ is assumed.

TABLE 13

| Embodiment | | Alt1 | Alt2 | Alt3 | Alt4 |
|---|---|---|---|---|---|
| Part1 CSI | $K_0$ | 14 | 14 | 14 | 14 |
| | Ns | — | — | — | 2 |
| | Config. | 4-bit for phase unrestricted | 4-bit for phase unrestricted | 4-bit for phase unrestricted | Strong-(4, 4) Else-(3, 4) unrestricted |
| Part2 CSI | Bitmap Idx for Ns | — | — | — | {2, 8} |

The above-described proposal scheme(s) (e.g., Proposal 1/1-1/1-2/2) is described in terms of the amplitude quantization, but may be applied even to the phase quantization, of course, and the operation may also be performed by applying different schemes to the amplitude quantization and the phase quantization, respectively. For example, the offset based quantization scheme is applied to the amplitude, and only the quantization level for the phase is reported, and as a result, an operation of mapping the corresponding level to the existing PSK operation or a pre-defined operation may be considered.

The UCI for the Type II CSI report may be newly designed through the above-described proposal method (e.g., Proposal 1, Proposal 2, etc.), and a CSI report which is effective even in terms of payload reduction may be performed by performing the quantization considering the RI/layer.

FIG. 12 illustrates an example of an operation flowchart of a UE which reports channel state information to which a method and/or an embodiment proposed in the present disclosure may be applied. FIG. 12 is just for convenience of the description and does not limit the scope of the present disclosure. Referring to FIG. 12, it is assumed that the UE and/or the BS operate(s) based the methods and/or embodiments of Proposals 1 to 2 described above. Further, in the operation of the UE and/or BS, the CSI related operations of FIG. 7 may be referenced/used. Some of steps described in FIG. 12 may be merged or omitted.

The UE may receive, from the BS, CSI related configuration information (S1210). The CSI related configuration information may include codebook related information. For example, the codebook may include at least one of information related to a spatial domain, information related to a frequency domain, or information on a linear combination coefficient. Further, the codebook may be configured based on a layer or a rank indicator (RI).

For example, the CSI related configuration information may include configuration information related to quantization of the linear combination coefficient. As an example, the configuration information related to the quantization may include a configuration for a quantization scheme, a quantization bit number, a quantization related offset, etc. As an example, the configuration for the quantization scheme may be indicated as a bitmap type. Alternatively, a scheme based on an offset or comb type may be configured.

For example, an operation of the UE (reference numeral 100/200 of FIGS. 14 to 18) which receives the CSI related configuration information from the BS (reference numeral 100/200 of FIGS. 14 to 18) in step S1210 described above may be implemented by devices of FIGS. 14 to 18 to be described below. For example, referring to FIG. 15, one or more processors 202 may control one or more transceivers 206 and/or one or more memories 204 so as to receive the CSI related configuration information, and one or more transceivers 206 may receive the CSI related configuration information from the BS.

The UE may receive a reference signal (RS) from the BS (S1220). The reference signal may be received based on the CSI related configuration information. The reference signal may be transmitted from the BS periodically, semi-persistently, or aperiodically. As an example, the reference signal may be a CSI-RS.

For example, an operation of the UE (reference numeral 100/200 of FIGS. 14 to 18) which receives the reference signal from the BS (reference numeral 100/200 of FIGS. 14 to 18) in step S1220 described above may be implemented by devices of FIGS. 14 to 18 to be described below. For example, referring to FIG. 15, one or more processors 202 may control one or more transceivers 206 and/or one or more memories 204 so as to receive the reference signal, and one or more transceivers 206 may receive the reference signal from the BS.

The UE may perform CSI measurement/calculation based on a reference signal (S1230). For example, an operation of measuring/calculating the CSI may be performed based on the above-described proposal method 9 e.g., Proposal 1/1-1/1-2/2, etc.). The operation of measuring/calculating the CSI may include an operation of quantizing an amplitude coefficient or a phase coefficient included in a matrix related to the codebook. In other words, the matrix related to the codebook may be generated by linearly combining a first matrix including a basis of a spatial domain and a second matrix including the basis of a frequency domain. The UE may perform quantization for at least one of the amplitude coefficient or the phase coefficient. Feedback overhead of a payload for a matrix of linear combination coefficients to be fed back may be reduced, which increases as a rank or a layer increases through the quantization for the amplitude coefficient and the phase coefficient.

The quantization may be performed for each layer or layer group. Further, the quantization may also be performed differently for each RI. Alternatively, the quantization may also be performed for each RI or layer combination. For example, an index of the layer and a quantization level may be in inverse proportion to each other. That is, as the index of the layer increases, a bit number for reporting coefficients for the corresponding layer may decrease.

For example, a first set of a reference amplitude for quantization of the amplitude coefficient and a second set of a differential amplitude may be pre-defined. The amplitude coefficient may be quantized based on a subset of (i) the first set and (ii) the second set. For example, step-sizes between respective components of the second set may be uniform. Alternatively, the step-sizes between respective components of the second set may be differently configured, and may be configured as a multiple of a specific number.

The number of components of the subset may be determined based on a bit width for reporting the quantized amplitude coefficient. For example, when a bit width is n bits (n is a natural number), the number of components may be $2^n$. As an example, when the bit width is 2 bits, the number of components of the subset may be 4.

The subset may be determined based on bitmap type information for the second set. As an example, when a bit width for reporting the quantized amplitude coefficient is 2 bits, bitmap type information including four 1s may be configured, and the subset may be constituted by the components of the second set corresponding to 1 of a bitmap. For example, the bitmap type information may be received from the BS or the UE may report, to the BS, the bitmap type information including the CSI for the subset configured thereby.

Alternatively, an amplitude coefficient to be quantized may also be indicated based on a first bitmap for the basis of the spatial domain and a second bitmap for the basis of the frequency domain. As an example, the quantization may be performed for an amplitude coefficient corresponding to a union or an intersection of the first bitmap and the second bitmap. If one of the first bitmap or the second bitmap is indicated and the other one is not indicated, it may be assumed that all bitmaps not indicated are indicated to '1'.

The subset may also be determined based on an offset value. For example, components may be selected as large as the number (e.g., $2^n$) of components of the subset from the differential amplitude from a value corresponding to an order after the offset value from a first value of the second set (i.e., the set of the differential amplitudes). If the number of components in the order after the offset value is smaller than the number of components of the subset (i.e., if the components may not be selected from the second set as large as the number of components of the subset, the subset may be constituted by using a specific value. For example, the specific value may be '0' or 'reserved'.

Alternatively, the subset may be selected as a comb type. For example, components may be selected from a value corresponding to an order after the offset value from a first value of the second set (i.e., the set of the differential amplitudes) as the comb type. If the number of components in the order after the offset value is smaller than the number of components of the subset (i.e., if the components may not be selected from the second set as large as the number of components of the subset, the subset may be constituted by using a specific value. For example, the specific value may be '0' or 'reserved'. Alternatively, for example, in regard to the specific value, components corresponding to a largest index (or a smallest index) among the components not selected in the second set are sequentially selected to constitute the subset.

For example, an operation of the UE (reference numeral 100200 of FIGS. 14 to 18) which measures/calculates CSI based on a reference signal in step S1230 described above may be implemented by devices of FIGS. 14 to 18 to be described below. For example, referring to FIG. 15, one or more processors 202 may control one or more transceivers 206 and/or one or more memories 204 to measure/calculate the CSI based on the reference signal.

The UE may transmit the CSI to the BS (S1240). The CSI may be transmitted through uplink control information (UCI) including a first part and a second part. An amplitude of the second part may be configured based on at least one information included in the first part.

The CSI may be Type II codebook based CSI reporting. For example, the codebook (or a precoder or a precoding matrix) may include at least one of spatial domain related information (e.g., an SD basis matrix), frequency domain related information (e.g., an FD basis matrix), or information (e.g., linear combining coefficient) on a linear combination coefficient. As an example, the codebook (or the precoder or the precoding matrix) may be represented as $W=W_1 \tilde{W}_2 W_f^H$, and here, $W_i$ may represent an SD basis related matrix, $\tilde{W}_2$ may represent a matrix of the linear combination coefficients, and $W_f^H$ may represent an FD basis related matrix. $\tilde{W}_2$ may be expressed as a matrix having a size of {the number of SD bases, 2L×the number of FD bases, M}. As an example, a first matrix (e.g., the matrix of the linear combination coefficients) may include the amplitude coefficient and the phase coefficient, and the first matrix may correspond to a linear combination of a second matrix (e.g., the SD basis related matrix) including the basis of the spatial domain and a third matrix (e.g., the FD basis related matrix) including the basis of the frequency domain.

The CSI may include information related to the codebook (or the precoder or the precoding matrix). The codebook related information may include a bitmap related to the amplitude coefficient and the phase coefficient, and the size of the bitmap may be configured as a product of the number of bases of the spatial domain for the CSI and the number of bases of the frequency domain for the CSI. As an example, the bitmap may be the size of {the number of SD bases, 2L×the number of FD bases, M}. As an example, the bitmap may be configured for each layer. As an example, the bitmap may be included in a second part (e.g., UCI part2, Part2 CSI) of the UCI and reported to the BS.

Further, the codebook related information may also include the information related to the amplitude coefficient and the information related to the phase coefficient. Whether the information related to the amplitude coefficient and the information related to the phase coefficient is reported may be indicated through the bitmap.

The CSI may further include information related to quantization. The quantization related information may include quantization bit allocation information, quantization scheme information, etc.

For example, the UE may quantize the channel coefficient (i.e., the amplitude coefficient and the phase coefficient) of each layer, and report, to the BS, the quantization bit allocation information for the corresponding coefficient. As an example, the quantization bit allocation information may include an index of the layer, information on a bit number of the amplitude coefficient, and information on a bit number of the phase coefficient. As an example, a bit number for the channel coefficient (the amplitude coefficient and the phase coefficient) for each layer may be configured as a ratio with respect to an indicated or configured specific bit number.

For example, when the quantization is performed for each layer, the quantization related information may include at least one of i) channel transform information of each layer, ii) a valid value or valid region information for the transform channel for each layer, or iii) quantization bit information for each valid region. As an example, the channel transform information may indicate a transform matrix (e.g., DFT, DCT, an orthogonal basis matrix, etc.) used for channel transform. As an example, values other than the valid value as a case where the phase coefficient or the amplitude coefficient is smaller than a specific threshold may be processed/configured to '0'. As an example, valid region information may be configured to a predetermined range based on a low frequency. Alternatively, an arbitrary range may also be configured based on a specific element. As an example, the valid region information may be expressed as an index and a range of a specific element (e.g., one of valid values) of the linear combination coefficient. Further, quantization bits for the amplitude coefficient and the phase coefficient may be allocated for each valid region.

For example, the quantization related information may include bitmap information for the quantization for each layer. As an example, the quantization related information may also include bitmap information for each of a row (e.g., a spatial domain (SD) or a column (e.g., a frequency domain (FD)) of channel information. As an example, the quantization related information may be configured in a form of a union or an intersection of a bitmap sequence for the row and the column. The bitmap information may be configured differently for each layer. Alternatively, the bitmap information is common for each layer, but as information separately indicating a union part and an intersection part may also configure information to be reported differently for each layer.

For example, a plurality of modes for a quantization bit configuration scheme may be pre-defined between the UE and the BS, and the quantization related information may include indication information for a used for quantization. As an example, since 'Fix' or 'Diff' may be configured as a quantization scheme for each of the amplitude coefficient and the phase coefficient, a total number of a plurality of modes which may be defined may become 4. The total number of modes which may be defined may vary according to the type of coefficient and the number of quantization schemes. For 'Fix', a specific bit number configured by the BS or the UE may be used, and for 'Diff', a ratio, etc., may also be used.

Further, for example, a first part (e.g. part 1 CSI) of UCI may include at least one of an indication for the number of non-zero coefficients of a matrix (e.g., a first matrix) of linear combination coefficients, Ns (an Ns value may configure or may be indicated with a range of $1 \leq Ns \leq 2L$), which is an indication for the number of strong coefficients among the coefficients, or a configuration/mode for quantization. A second part (e.g., part 2 CSI) of the UCI may include at least one of a bitmap indication for the non-zero coefficients or indices for NS coefficients for Ns coefficients.

For example, the UE may transmit information on a scheme applied for the amplitude coefficient or the phase coefficient, i.e., quantization scheme information. For example, in the method described in Proposal 1-2 described above, the quantization bit number of the amplitude coefficient or the phase coefficient and a quantization scheme (e.g., a bitmap scheme or a differential amplitude set based scheme) may be applied differently for each RI or layer/layer group, and the UE may transmit the quantization scheme applied thereby and the quantization bit number information as the quantization scheme information.

For example, the CSI may include the subset related information. For example, when quantization for the amplitude coefficient is performed based on a subset of a set (i.e., a second set) of differential amplitude, information on the subset configuration may be included in the quantization scheme information. As an example, the information on the subset configuration may be bitmap type information. Alternatively, the information on the subset configuration may include offset information related to the subset, Comb related information (e.g., a Comb type/Comb size), etc. Alternatively, the information on the subset configuration may also further include information on a step-size between respective components of the set (i.e., second set) of the differential amplitude.

For example, an operation of the UE (reference numeral 100/200 of FIGS. 14 to 18) which transmits the CSI to the BS (reference numeral 100/200 of FIGS. 14 to 18) in step S1240 described above may be implemented by devices of FIGS. 14 to 18 to be described below. For example, referring to FIG. 15, one or more processors 202 may control one or more transceivers 206 and/or one or more memories 204 so as to transmit the CSI and one or more transceivers 206 may transmit the CSI to the BS.

FIG. 13 illustrates an example of an operation flowchart of a BS which receives channel state information to which a method and/or an embodiment proposed in the present disclosure may be applied. The BS may be a mean collecting naming an object performing transmission and reception of data with the UE. For example, the base station may be a concept including one or more transmission points (TPs), one or more transmission and reception points (TRPs), and the like. Further, the TP and/or the TRP may include a panel, transmission and reception units, and the like of the BS. FIG. 13 is just for convenience of the description and does not limit the scope of the present disclosure. Referring to FIG. 13, it is assumed that the UE and/or the BS operate(s) based the methods and/or embodiments of Proposals 1 to 2 described above. Further, in the operation of the UE and/or BS, the CSI related operations of FIG. 7 may be referenced/used. Some of steps described in FIG. 13 may be merged or omitted.

The BS may transmit, to the UE, CSI related configuration information (S1310). The CSI related configuration information may include codebook related information.

For example, the codebook may include at least one of information related to a spatial domain, information related to a frequency domain, or information on a linear combination coefficient. Further, the codebook may be configured based on a layer or a rank indicator (RI).

For example, the CSI related configuration information may include configuration information related to quantization of the linear combination coefficient. As an example, the configuration information related to the quantization may include a configuration for a quantization scheme, a quantization bit number, a quantization related offset, etc. As an example, the configuration for the quantization scheme may be indicated as a bitmap type. Alternatively, a scheme based on an offset or comb type may be configured.

For example, an operation of the BS (reference numeral 100/200 of FIGS. 14 to 18) which transmits the CSI related configuration information to the UE (reference numeral 100/200 of FIGS. 14 to 18) in step S1310 described above may be implemented by devices of FIGS. 14 to 18 to be described below. For example, referring to FIG. 15, one or more processors 202 may control one or more transceivers 206 and/or one or more memories 204 so as to transmit the CSI related configuration information, and one or more transceivers 206 may transmit the CSI related configuration information to the UE.

The BS may transmit a reference signal (RS) to the UE (S1320). The reference signal may be transmitted based on the CSI related configuration information. The reference signal may be transmitted from the BS periodically, semi-persistently, or aperiodically.

For example, an operation of the BS (reference numeral 100/200 of FIGS. 14 to 18) which transmits the reference signal to the UE (reference numeral 100/200 of FIGS. 14 to 18) in step S1320 described above may be implemented by devices of FIGS. 14 to 18 to be described below. For example, referring to FIG. 15, one or more processors 202 may control one or more transceivers 206 and/or one or more memories 204 so as to transmit the reference signal and one or more transceivers 206 may transmit the reference signal to the UE.

The BS may receive CSI to the UE (S1330). The CSI may be received through uplink control information (UCI) including a first part and a second part. An amplitude of the second part may be configured based on at least one information included in the first part.

The CSI may be Type II codebook based CSI reporting. For example, the codebook (or a precoder or a precoding matrix) may include at least one of spatial domain related information (e.g., an SD basis matrix), frequency domain related information (e.g., an FD basis matrix), or information (e.g., linear combining coefficient) on a linear combination coefficient. As an example, a first matrix (e.g., the matrix of the linear combination coefficients) may include the amplitude coefficient and the phase coefficient, and the first matrix may correspond to a linear combination of a second matrix (e.g., the SD basis related matrix) including the basis of the spatial domain and a third matrix (e.g., the FD basis related matrix) including the basis of the frequency domain.

The CSI may include information related to the codebook (the precoder or the precoding matrix). The codebook related information may include a bitmap related to the amplitude coefficient and the phase coefficient, and the size of the bitmap may be configured as a product of the number of bases of the spatial domain for the CSI and the number of bases of the frequency domain for the CSI. As an example, the bitmap may be the size of {the number of SD bases, 2L×the number of FD bases, M}. As an example, the bitmap may be included in a second part (e.g., UCI part2, Part2 CSI) of the UCI and reported to the BS. As an example, the bitmap may be configured for each layer.

Further, the codebook related information may also include the information related to the amplitude coefficient and the information related to the phase coefficient. Whether the information related to the amplitude coefficient and the information related to the phase coefficient is reported may be indicated through the bitmap.

In order to reduce the payload for the matrix of linear combination coefficients to be fed back, the amplitude coefficient and the phase coefficient may also be quantized. The quantization may be performed for each layer or layer group. Further, the quantization may also be performed differently for each RI. Alternatively, the quantization may also be performed for each RI or layer combination. In this case, the CSI may further include information related to quantization.

For example, a first set of a reference amplitude for quantization of the amplitude coefficient and a second set of a differential amplitude may be pre-defined. The amplitude coefficient may be quantized based on a subset of (i) the first set and (ii) the second set.

The subset may be determined based on bitmap type information for the second set. As an example, when a bit width for reporting the quantized amplitude coefficient is 2 bits, bitmap type information including four 1s may be configured, and the subset may be constituted by the components of the second set corresponding to 1 of a bitmap. For example, the BS may receive bitmap type information related to a subset configuration of the UE through the CSI.

Alternatively, an amplitude coefficient may be quantized based on a first bitmap for the basis of the spatial domain and a second bitmap for the basis of the frequency domain. For example, the CSI may include the first bitmap information and the second bitmap information related to the quantized amplitude coefficient. As an example, the CSI may include only one of the first bitmap or the second bitmap, and the BS may recognize that all bitmaps not included are indicated to '1'.

The subset may also be determined based on an offset value. For example, components may be selected as large as the number (e.g., 2^n) of components of the subset from the differential amplitude from a value corresponding to an order after the offset value from a first value of the second set (i.e., the set of the differential amplitudes). Alternatively, the subset may be selected as a comb type. For example, components may be selected from a value corresponding to an order after the offset value from a first value of the second set (i.e., the set of the differential amplitudes) as the comb type. For example, the CSI may include the offset value or Comb related information.

For example, the quantization related information may include an index of the layer, information on a bit number of the amplitude coefficient, and information on a bit number of the phase coefficient. As an example, a bit number for the channel coefficient (the amplitude coefficient and the phase coefficient) for each layer may be configured as a ratio with respect to an indicated or configured specific bit number. As an example, as the index of the layer increases, a bit number of coefficients for the corresponding layer may decrease.

For example, the quantization related information may include at least one of i) channel transform information of each layer, ii) a valid value or valid region information for the transform channel for each layer, or iii) quantization bit information for each valid region. As an example, the channel transform information may indicate a transform matrix (e.g., DFT, DCT, an orthogonal basis matrix, etc.) used for channel transform. As an example, values other than the valid value as a case where the phase coefficient or the amplitude coefficient is smaller than a specific threshold may be processed/configured to '0'. As an example, the valid region information may be configured to a predetermined range based on a low frequency. Alternatively, an arbitrary range may also be configured based on a specific element. As an example, the valid region information may be expressed as an index and a range of a specific element (e.g., one of valid values) of the linear combination coefficient. Further, quantization bits for the amplitude coefficient and the phase coefficient may be allocated for each valid region.

For example, the quantization related information may include bitmap information for the quantization for each layer. As an example, the quantization related information may also include bitmap information for each of a row (e.g., a spatial domain (SD) or a column (e.g., a frequency domain (FD)) of channel information. As an example, the quantization related information may be configured in a form of a union or an intersection of a bitmap sequence for the row and the column. The bitmap information may be configured differently for each layer. Alternatively, the bitmap information is common for each layer, but as information separately indicating a union part and an intersection part may also configure information to be reported differently for each layer.

For example, a plurality of modes for a quantization bit configuration scheme may be pre-defined between the UE and the BS, and the quantization related information may include indication information for a used for quantization.

For example, an operation of the UE (reference numeral 100/200 of FIGS. 14 to 18) which receives the CSI from the BS (reference numeral 100/200 of FIGS. 14 to 18) in step S1330 described above may be implemented by devices of FIGS. 14 to 18 to be described below. For example, referring to FIG. 15, one or more processors 202 may control one or more transceivers 206 and/or one or more memories 204 so as to receive the CSI and one or more transceivers 206 may receive the CSI from the UE.

Through the above-described methods and embodiments, a CSI report which is efficient in terms of a payload may be performed based on quantization considering the codebook and the layer/rank for Type II CSI reporting.

Further, in the methods and embodiments, the UE and/or the BS which operate according to each of the steps of FIG. 12/13 may be specifically implemented by devices of FIGS. 14 to 18 to be described below. For example, the BS may correspond to a first wireless device and the UE may correspond to a second wireless device and in some cases, an opposite thereto may also be considered.

For example, the BS/UE signaling and operation (e.g., FIG. 12/13) may be processed by one or more processors (e.g., 102 and 202) of FIGS. 14 to 18 and the BS/UE signaling and operation (e.g., FIG. 12/13) may be stored in a memory (e.g., one or more memories (e.g., 104 and 204) of FIGS. 14 to 18) in the form of a command/program (e.g., instruction and executable code) for driving at least one processor (e.g., 102 and 202) of FIGS. 14 to 18.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 14 illustrates a communication system applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200 a may operate as a BS/network node with respect to other wireless devices.

The wireless devices 100a to 100f may be connected to the network 300 via the BSs 120. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 3110x and the BS 200} and/or {the wireless device 3110x and the wireless device 3110x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 3110 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Signal Processing Circuit Example to which Present Disclosure is Applied

FIG. 16 illustrates a signal processing circuit for a transmit signal.

Referring to FIG. 16, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 16 may be performed by the processors 102 and 202 and/or the transceivers 106 and 206 of FIG. 15. Hardware elements of FIG. 16 may be implemented in the processors 102 and 202 and/or the transceivers 106 and 206 of FIG. 15. For example, blocks 1010 to 1060 may be implemented in the processors 102 and 202 of FIG. 15. Further, blocks 3310 to 3350 may be implemented in the processors 102 and 202 of FIG. 15 and the block 3360 of FIG. 15 and the block 2760 may be implemented in the transceivers 106 and 206 of FIG. 15.

A codeword may be transformed into a radio signal via the signal processing circuit 1000 of FIG. 16. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like A signal processing process for a receive signal in the wireless device may be configured in the reverse of the signal processing process (3310 to 3360) of FIG. 16. For example, the wireless device (e.g., 100 or 200 of FIG. 15) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder Wireless Device Example to which Present Disclosure is Applied FIG. 17 illustrates another example of a wireless device applied to the present disclosure. The wireless device may be implemented in various forms according to a use-case/service (refer to FIG. 17).

Referring to FIG. 17, wireless devices 3110 and 200 may correspond to the wireless devices 3110 and 200 of FIG. 14 and may be configured by various elements, components, units/portions, and/or modules. For example, each of the wireless devices 3110 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 3110 and 200 may be connected to each other through a wired interface or at least a part thereof may be wirelessly connected through the communication unit 110. For example, in each of the wireless devices 3110 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 3110 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Disclosure is Applied

FIG. 18 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 18, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 14, respectively.

The communication unit 110 may transmit/receive a signal (e.g., data, a control signal, etc.) to/from another wireless device and eNBs. The control unit 120 may perform various operations by controlling components of the portable device 3110. The control unit 120 may include an Application Processor (AP). The memory unit 130 may store data/parameters/programs/codes/instructions required for driving the portable device 3110. Further, the memory unit 130 may store input/output data/information, etc. The power supply unit 140*a* may supply power to the portable device 3110 and include a wired/wireless charging circuit, a battery, and the like. The interface unit 140*b* may support a connection between the portable device 3110 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a scheme of transmitting and receiving data in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for reporting, by a user equipment (UE), channel state information (CSI) in a wireless communication system, the method comprising:
receiving, from a base station (BS), CSI related configuration information;
receiving, from the BS, a reference signal;
calculating the CSI based on the reference signal; and
transmitting, to the BS, the CSI,
wherein the calculating of the CSI includes quantizing an amplitude coefficient included in a matrix related to a codebook,
wherein a first set of a reference amplitude for quantization of the amplitude coefficient and a second set of a differential amplitude are predefined, and
wherein the amplitude coefficient is quantized based on a subset of (i) the first set and (ii) the second set.

2. The method of claim 1, wherein the subset is determined based on bitmap type information for the second set.

3. The method of claim 1, wherein the number of components of the subset is determined based on a bit width for reporting the quantized amplitude coefficient.

4. The method of claim 3, wherein
the subset is determined based on an offset value, and
wherein from a first component of the second set up to a component corresponding to an index after the offset value are selected as large as the number of components.

5. The method of claim 4, wherein when the number of selected components is smaller than the number of components of the subset, the subset is constituted by using a specific value.

6. The method of claim 4, wherein the subset is selected in a comb form among components after the offset value of the second set.

7. The method of claim 6, wherein when the number of selected components is smaller than the number of components of the subset, the subset is constituted by a value corresponding to a largest index which is not selected in the second set.

8. The method of claim 1, wherein the quantization is performed for each layer or layer group.

9. The method of claim 1, wherein the matrix related to the codebook is generated by linearly combining a first matrix including a basis of a spatial domain and a second matrix including the basis of a frequency domain.

10. The method of claim 9, wherein an amplitude coefficient to be quantized is determined based on a first bitmap for the basis of the spatial domain and a second bitmap for the basis of the frequency domain.

11. The method of claim 1, wherein a step-size between the respective components of the second set is set to a multiple of a specific number.

12. The method of claim 1, wherein the calculating of the CSI further includes quantizing a phase coefficient included in the matrix related to the codebook.

13. The method of claim 1, wherein the reported CSI includes the subset related information.

14. A user equipment (UE) for reporting Channel State Information (CSI) in a wireless communication system, the UE comprising:
one or more transceivers;
one or more processors; and
one or more memories storing instructions for operations executed by the one or more processors and connected to the one or more processors,
wherein the operations include:
receiving, from a base station (BS), CSI related configuration information;
receiving, from the BS, a reference signal;
calculating the CSI based on the reference signal; and
transmitting, to the BS, the CSI,
wherein the calculating of the CSI includes quantizing an amplitude coefficient included in a matrix related to a codebook,
wherein a first set of a reference amplitude for quantization of the amplitude coefficient and a second set of a differential amplitude are predefined, and
wherein the amplitude coefficient is quantized based on a subset of (i) the first set and (ii) the second set.

15. A base station (BS) for receiving channel state information (CSI) in a wireless communication system, the BS comprising:
one or more transceivers;
one or more processors; and
one or more memories storing instructions for operations executed by the one or more processors and connected to the one or more processors,
wherein the operations include:
transmitting, to a user equipment (UE), CSI related information;
transmitting, to the UE, a reference signal; and
receiving, from the UE, the CSI,
wherein the CSI includes information related to quantization of an amplitude coefficient included in a matrix related to a codebook,
wherein a first set of a reference amplitude for quantization of the amplitude coefficient and a second set of a differential amplitude are predefined, and
wherein the amplitude coefficient is quantized based on a subset of (i) the first set and (ii) the second set.

* * * * *